(12) United States Patent
Hong et al.

(10) Patent No.: US 11,015,155 B2
(45) Date of Patent: May 25, 2021

(54) FERMENTER

(71) Applicant: LG ELECTRONICS INC., Seoul (KR)

(72) Inventors: Jinpyo Hong, Seoul (KR); Daewoong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 281 days.

(21) Appl. No.: 16/189,028

(22) Filed: Nov. 13, 2018

(65) Prior Publication Data

US 2019/0144803 A1 May 16, 2019

(30) Foreign Application Priority Data

Nov. 15, 2017 (KR) .................. 10-2017-0152577

(51) Int. Cl.
*C12C 11/00* (2006.01)
*C12C 13/10* (2006.01)
*A47J 31/46* (2006.01)
*C12C 11/07* (2006.01)
*A47J 31/44* (2006.01)
*C12G 1/036* (2006.01)

(52) U.S. Cl.
CPC .......... *C12C 13/10* (2013.01); *A47J 31/4403* (2013.01); *A47J 31/462* (2013.01); *C12C 11/006* (2013.01); *C12C 11/075* (2013.01); *C12G 1/0206* (2013.01); *C12C 11/07* (2013.01)

(58) Field of Classification Search
CPC .............................. C12C 11/006; C12C 11/07
USPC ....................................... 99/277, 277.1, 276
See application file for complete search history.

(56) References Cited

U.S. PATENT DOCUMENTS

| 4,423,670 | A | * | 1/1984 | Tenison | ..................... | A23L 2/40 |
| | | | | | | 261/DIG. 7 |
| 5,364,639 | A | * | 11/1994 | MacLennan | .......... | C12C 11/006 |
| | | | | | | 426/11 |
| 5,470,746 | A | * | 11/1995 | Kim | ........................ | C12M 41/34 |
| | | | | | | 435/287.1 |
| 5,802,956 | A | | 9/1998 | Robertson et al. | | |
| 6,561,078 | B1 | * | 5/2003 | Hughes | ................... | C12C 13/10 |
| | | | | | | 210/242.1 |
| 6,629,490 | B1 | * | 10/2003 | Lu | ........................ | C12G 1/0206 |
| | | | | | | 99/276 |

(Continued)

FOREIGN PATENT DOCUMENTS

| EP | 3 246 385 | 11/2017 |
| GB | 1224 | 1/1910 |
| WO | WO 2011/017777 | 2/2011 |

OTHER PUBLICATIONS

Extended European Search Report dated Mar. 15, 2019 issued in Application 18188678.9.

*Primary Examiner* — Reginald Alexander
(74) *Attorney, Agent, or Firm* — Ked & Associates LLP

(57) ABSTRACT

A fermenter may include a fermentation container having a fermentation space in which a beverage is fermented and a first gas passage communicating with the fermentation space, and a fermentation lid opening and closing the fermentation container and having a second gas passage. When the fermentation lid closes the fermentation container, a gas chamber communicating with each of the first gas passage and the second gas passage is provided between the fermentation container and the fermentation lid.

18 Claims, 20 Drawing Sheets

(56) References Cited

U.S. PATENT DOCUMENTS

2016/0194587 A1* 7/2016 Ellegood ............... C12C 13/10
426/16

* cited by examiner

FERMENTER

CROSS-REFERENCE TO RELATED APPLICATION(S)

The present application claims priority under 35 U.S.C. 119 and 35 U.S.C. 365 to Korean Patent Application No. 10-2017-0152577, filed on Nov. 15, 2017, which is hereby incorporated by reference in its entirety.

BACKGROUND

1. Field

A fermenter is disclosed herein.

2. Background

Beverages or drinks may be collectively referred to as drinkable liquids, such as alcohol, tea, etc. Beverages may be classified into various categories, including thirst quenching drinks such as water, drinks having a unique flavor or extracted from plants such as tea, juice, or fruit beverages, refreshing beverages such as carbonated soft drinks, aphrodisiac beverages, or alcoholic beverages, for example.

Beer is an alcoholic beverage that may be produced by using malt made from sprouting or germinated barley to make a juice, wort, or liquid extract, filtering the liquid extract, adding hops, and fermenting the liquid extract using yeast. Consumers may purchase ready-made products produced and sold by a beer maker or a beer manufacturer, or may purchase house beer (or handmade beer or craft beer) made by directly fermenting or brewing beer ingredients at home or in a bar.

House beer may be made or brewed in a large variety of types of beer as compared with ready-made beer products, and may be custom made to suit the tastes of consumers. The ingredients used to make beer may include water, malt, hops, yeast, flavoring additives or flavor additives, etc. The yeast, which may be called leaven, may be added to malt to ferment the malt, and may help to produce alcohol and carbonic acid. The flavor additives may include additives that enhance the taste of beer, such as fruit, syrup, and vanilla beans, for example.

Generally, the production or brewing process of house beer may include three stages; namely, a wort production or generation step, a fermentation step, and an aging, riping, or maturation step. It may take about two to three weeks to complete all three steps. It is important that house beer is maintained at an optimum temperature during the fermentation step. Simpler production or manufacturing processes of house beer are generally more convenient for beer producers and consumers. Recently, consumers have started using beverage makers, which may be capable of easily making house beer in a home or a bar. Such a beverage maker should safely and easily make beer.

BRIEF DESCRIPTION OF THE DRAWINGS

The embodiments will be described in detail with reference to the following drawings in which like reference numerals refer to like elements wherein.

DETAILED DESCRIPTION

Figure 1:
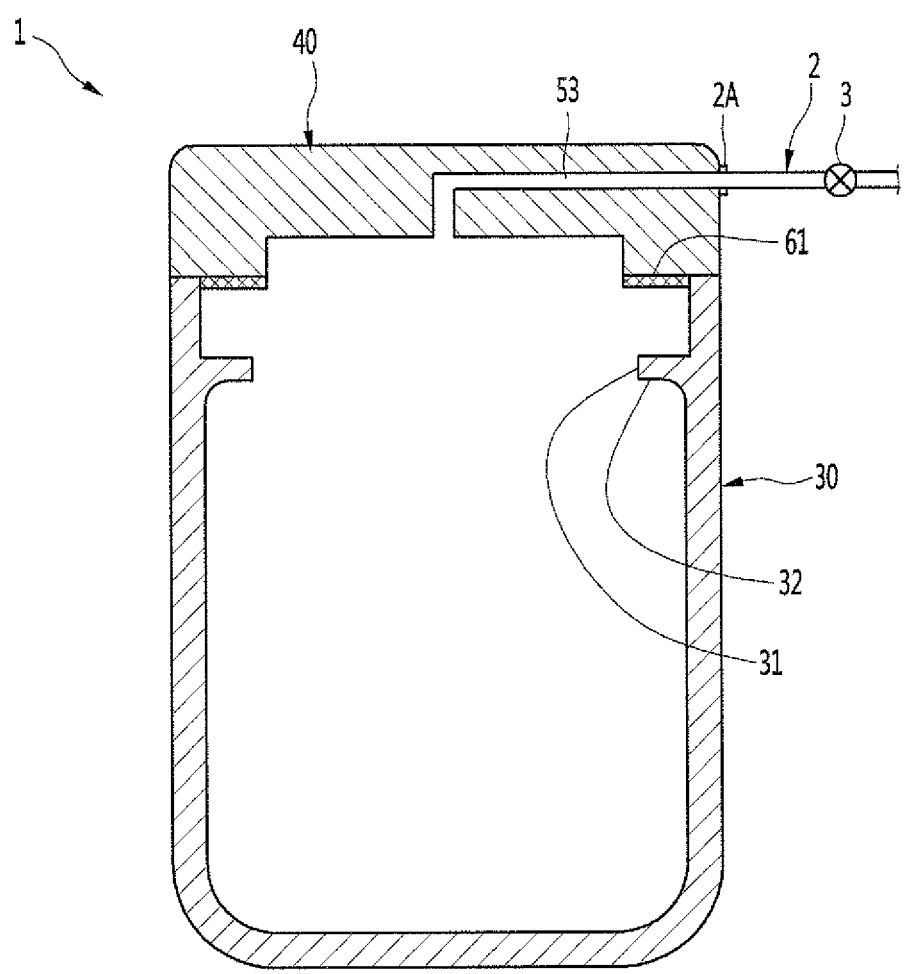
FIG. 1 is a cross-sectional view illustrating a state in which a beverage making pack is not accommodated in a fermentation tank in a fermenter according to an embodiment.

Hereinafter, detailed embodiments of the present disclosure will be described in detail with reference to the accompanying drawings. Although beer is exemplified as a beverage made by using a fermenter in this specification, beverages that are capable of being made using the disclosed fermenter are not limited to beer. Various kinds of other beverages may be made through the fermenter according to embodiments.

A fermenter according to an embodiment will now be described with reference to FIGS. 1 to 3. The fermenter 1 may include a fermentation container or container 10 and a fermentation lid or lid 40. A fermentation space or space S1 in which a beverage is fermented and at least one first gas passage 51 communicating with the space S1 may be provided in the container 10.

The container 10 may include a beverage making pack or beverage pack 20 and a fermentation tank or tank 30. An opening 31 may be defined in the tank 30, and the beverage pack 20 may be inserted through the opening 31. The space S1 and the first gas passage 51 may be provided in the beverage pack 20. The beverage pack 20 may have an opening to accommodate the first gas passage 51, or may be structured to define the first gas passage 51.

The beverage pack 20 may include a pack body 21 and a pack container 22. The pack body 21 or a portion of the pack body 21 may be supported by a support part or support 32 provided on the tank 30. The pack body 21 may be a resin molding or resin casted product or may include a solid material. The pack container 22 may be attached to the pack body 21 and may be accommodated in the tank 30. The pack container 22 may be made of a soft material and may be adjustable in volume so that the pack container 22 may be easily inserted into the opening 31 of the tank 30. However, this embodiment is not limited thereto. For example, the pack container 22 may be made of a polyethylene terephthalate (PET) or plastic material. An inner space of the pack container 22 may include the space S1, and the first gas passage 51 communicating with the space S1 may be provided in the pack body 21.

The lid 40 may open and close the container 10. The lid 40 may be provided on an upper portion of the container 10 to open and close the container 10. The lid 40 may open and close the opening 31 of the tank 30 together with the beverage pack 20. Each of the container 10 and the lid 40 may have an approximately cylindrical shape, but these shapes are not limited thereto. The lid 40 and the container 10 are not limited in connection manner therebetween. For example, the lid 40 may be connected to the container 10 through a hinge, or may be separately or detachably connected to the container 10.

A second gas passage 53 may be provided in the lid 40. The second gas passage 53 may include a vertical part or a vertical portion 53A lengthily or longitudinally provided in a vertical or transverse direction, and a horizontal part or a horizontal portion 53B lengthily or longitudinally provided in a horizontal or lateral direction when the lid 40 closes the container 10. A gas within a gas chamber or chamber 52 may be guided to successively pass through the vertical portion 53A and the horizontal portion 53B of the second gas passage 53. However, this embodiment is not limited thereto. For example, the second gas passage 53 may vary in shape as necessary. For example, the second gas passage 53 may have a curved tube shape or be provided with only a vertical part or portion.

The second gas passage 53 may extend to the outside of the fermenter 1, or may be provided in only the inside of the lid 40. In addition, the second gas passage 53 may be connected to a separate external gas passage 2. A structure in which the second gas passage 53 is connected to the external gas passage 2 will be described as an example.

A gas passing through the second gas passage 53 may be introduced into an external gas passage 2, and the external gas passage 2 may guide the introduced gas up to a discharge position or location. A gas discharge valve or valve 3 may be provided in the external gas passage 2. The valve 3 may open and close the external gas passage 2, or may be adjusted in various degrees of opening to adjust the discharge of the gas.

Figure 2:
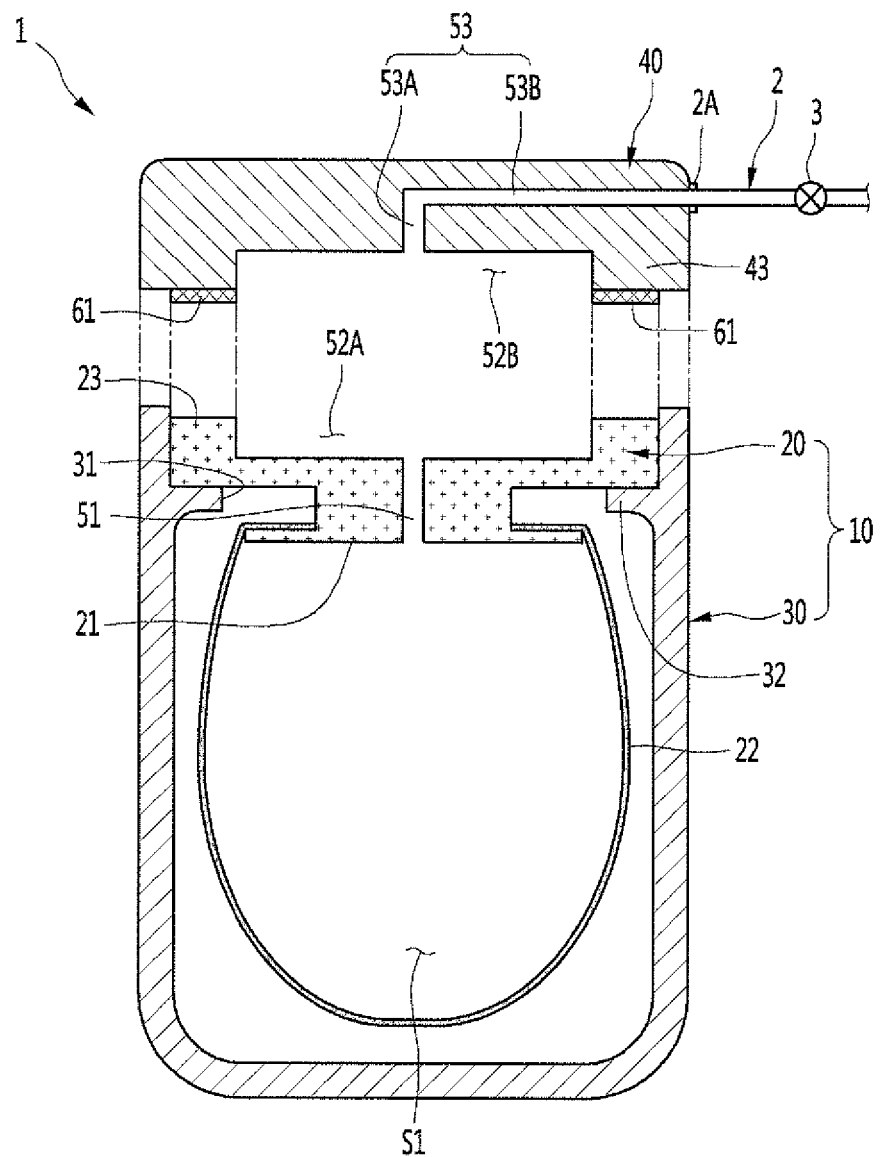
FIG. 2 is a cross-sectional view illustrating a state in which a fermentation lid of the fermenter of FIG. 1 is opened, and the beverage making pack is accommodated in the fermentation tank.
Figure 3:
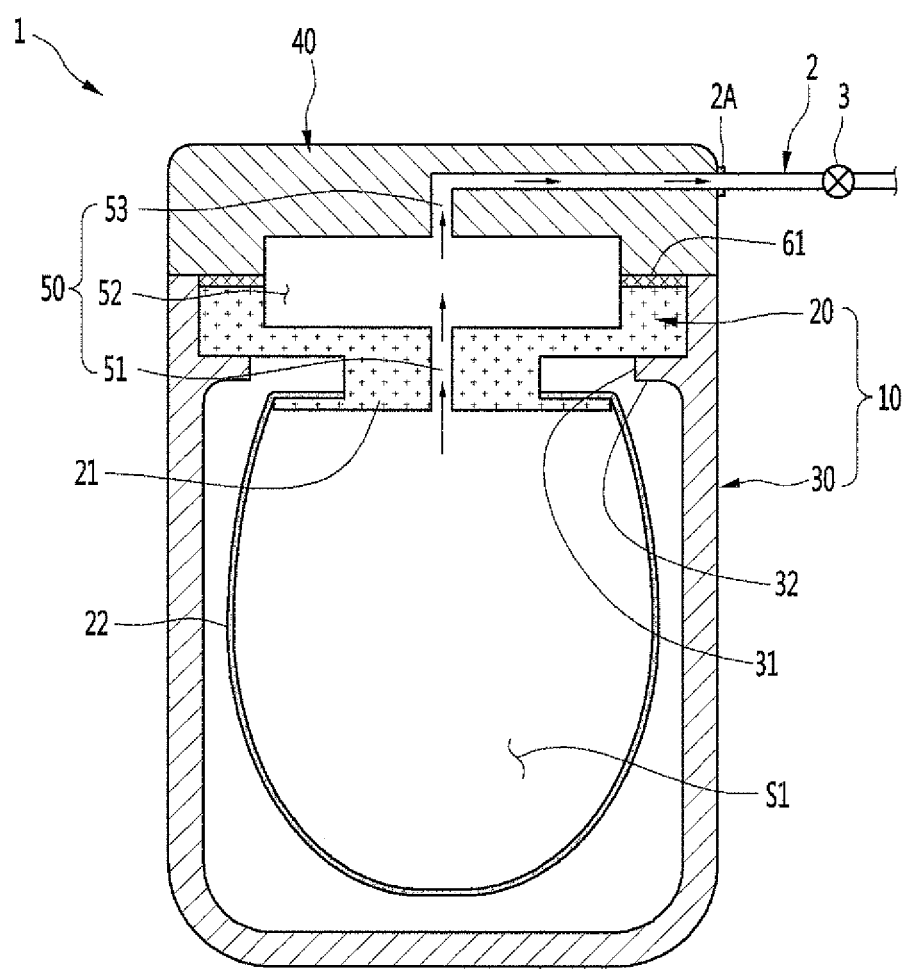
FIG. 3 is a view illustrating a flow of a gas discharged through a gas passage when the fermentation lid of the fermenter of FIG. 2 is closed.

A connection part or connector 2A between the external gas passage 2 and the second gas passage 53 may be provided on an outer circumference of the fermentation lid 40 as illustrated in FIGS. 1 to 3. However, this embodiment is not limited thereto. For example, the external gas passage 2 may be inserted into the lid 40 and connected to the second gas passage 53. In this case, the connector 2A between the external gas passage 2 and the second gas passage 53 may be provided inside the fermentation lid 40.

When the lid 40 closes the container 10, the gas chamber 52 may be provided between the container 10 and the lid 40. The gas chamber 52 may communicate with each of the first gas passage 51, provided in the container 10, and the second gas passage 53, provided in the lid 40. The first gas passage 51, the gas chamber 52, and the second gas passage 53 may constitute a gas passage 50 through which gas generated in the space S1 may be discharged to the outside of the fermenter 1. The gas generated in the space S1 during fermentation may be introduced into the gas chamber 52 through the first gas passage 51, and the gas introduced into the gas chamber 52 may be discharged to the outside of the fermenter 1 through the second gas passage 53.

In order to appropriately maintain an internal pressure of the space S1 during fermentation, each of the first gas passage 51 and the second gas passage 53 may have a sufficiently small cross-sectional area. The gas chamber 52 may have a cross-sectional area greater than that of each of the first gas passage 51 and the second gas passage 53. Here, each of the cross-sectional areas may represent a sectional area that is perpendicular to a direction of a flow of the gas. Even if the first gas passage 51 and the second gas passage 53 may not be provided at positions that accurately correspond to each other, the gas generated in the space S1 may be easily discharged along the gas passage 50. When there is a plurality of first gas passages 51, the gas guided to the plurality of first gas passages 51 may be concentrated into the gas chamber 52 and then guided to the second gas passage 53.

An outer hollow part or outer protrusion 23 and/or 43 may be defined in at least one of the beverage pack 20 or the fermentation lid 40, and inner or central spaces 52A and 52B of the outer protrusion 23 and/or 43 may define the gas chamber 52. Hereinafter, a structure in which outer protrusions 23 and 43 are respectively defined in the beverage pack 20 and the lid 40 will be described as an example for convenience of description. The outer protrusions 23 and 43 may have a ring or donut shape such that they surround a circular inner space. The container-side outer protrusion 23 may be defined in the beverage pack 20, and a lid-side outer protrusion 43 may be defined in the lid 40. The container-side outer protrusion 23 may protrude upward, and the lid-side outer protrusion 43 may protrude downward. The container-side outer protrusion 23 and the lid-side outer protrusion 43 may be provided at positions corresponding to each other.

When the lid 40 closes the container 10, the container-side outer protrusion 23 and the lid-side outer protrusion 43 may contact each other or overlap each other in a vertical or transverse direction. However, this embodiment is not limited thereto. When the lid 40 closes the container 10, an outer circumferential surface of the lid-side outer protrusion 43 and an inner circumferential surface of the container-side outer protrusion 23 may contact each other. When the lid 40 closes the container 10, the inner space 52A of the container-side outer protrusion 23 and the inner space 52B of the lid-side outer protrusion 43 may define the gas chamber 52 together with each other.

The fermenter 1 may further include a sealing or outer seal 61 that prevents gas within the gas chamber 52 from leaking between the lid 40 and the container 10. The outer seal 61 may be made of a material having elasticity such as rubber. The outer seal 61 may be provided on at least one of the lid 40 or the container 10. The outer seal 61 may be provided on at least one of the container-side outer protrusion 23 or the lid-side outer protrusion 43. When the lid 40 closes the container 10, the outer seal 61 may be compressed between the lid 40 and the container 10 to improve a sealing effect and security of any contents of the container. When the outer seal 61 is provided, the gas introduced into the gas chamber 52 through the first gas passage 51 may be completely guided to the second gas passage 53.

An operation of the fermenter 1 according to an embodiment will be described. A user may open the lid 40 to put the beverage pack 20 into the opening 31 of the tank 30. Here, a fermentation material or ingredient may be contained in the beverage pack 20. Thereafter, the user may close the lid 40 to close the container 10 and start fermentation.

As the fermentation progresses, gas may be generated in the space S1 within the beverage pack 20. Thus, an inner pressure of the space S1 may gradually increase to expand the pack container 22 and may eventually reach an appropriate level or optimum inner pressure. If gas is continuously generated even though an optimum inner pressure of the space S1 is reached, the gas may be introduced into the gas chamber 52 through the first gas passage 51, and the gas within the gas chamber 52 may be discharged to the outside of the fermenter 1 through the second gas passage 53 such that the optimum inner pressure is maintained.

If the second gas passage 53 is connected to the external gas passage 2, when the valve 3 is opened, the gas passing through the second gas passage 53 may be guided to the external gas passage 2 and then discharged. As a result, the inner pressure of the space S1 may be maintained at the optimum inner pressure such that fermentation progresses. Also, the valve 3 may be adjusted to control the inner pressure. A fermenter according to an embodiment will be described with reference to FIGS. 4 to 6. The fermenter according to this embodiment is the same as that according to the embodiment described with reference to FIGS. 1-3 except for the inclusion of a main passage or a fluid passage 70 and related constituents, and thus, their duplicated description will be omitted, and differences will be mainly described. As compared with the above-mentioned embodiment, a fermenter 1 according to this embodiment may further include a main passage or fluid passage 70.

A first portion of the fluid passage 70 may be provided in a container 10 to communicate with a space S1, and a second portion may be provided in the lid 40. The fluid passage 70 may guide a fluid introduced from the outside of the fermenter 1 to the space S1. The fluid may be or may include a liquid, or may be or include a gas. For example, when a beverage made in the fermenter 1 is beer, the fluid may be water, air, wort or juice or liquid extract, a mixture of water and malt, or a mixture of water and additives (yeast, hops, and oil, for example).

The fluid passage 70 may also guide a fluid in the space S1 to the outside of the fermenter 1. The fluid may include a liquid, and/or may include a gas. For example, the fluid may be a beverage such as the completely produced beer. In order to easily dispense the beverage, the fluid passage 70 may be connected to a tube that extends downward to approach a bottom surface of the inside of the beverage pack 20. That is, the fluid passage 70 may allow fluid to flow in both directions. In order to allow a fluid to smoothly flow, the gas chamber 52 may have a cross-sectional area greater than that of each of a first gas passage 51 and a second gas passage 53. The fluid passage 70 may include a first main passage or first fluid passage 71 and a second main passage or second fluid passage 72. Each of the first fluid passage 71 and the second fluid passage 72 may have a cross-sectional area greater than that of each of the first gas passage 51 and the second gas passage 53.

The fluid passage 70 may pass through a gas chamber 52. That is, the first fluid passage 71 and the second fluid passage 72 may pass through the gas chamber 52 together with each other. The fluid passage 70 may have a cross-sectional area less than that of the gas chamber 52. The first fluid passage 71 and the second fluid passage 72 may each have a cross-sectional area less than that of the gas chamber 52. The gas chamber 52 may thus have an approximately torus shape or donut shape. Such a fermenter 1 may be more compact as compared with a structure in which the fluid passage 70 is provided outside the gas chamber 52.

The space S1 may be referred to as a first space, while the gas chamber 52 may be referred to as a second space. The first and second gas passages 51 and 53 may be referred to as first and second passages, respectively, and the first and second fluid passages 71 and 72 may be referred to as third and fourth passages, respectively. In addition, the first gas passage 51 and the first fluid passage 71 may be referred to as first and second container passages, respectively, while the second gas passage 53 and the second fluid passage 72 may be referred to as first and second lid passages, respectively.

The first fluid passage 71 may be spaced apart from the first gas passage 51 in the container 10. The first fluid passage 71 may be provided in a pack body 21 of a beverage making pack 20. Alternatively, the first fluid passage 71 may be provided inside the first gas passage 51 of the container 10. That is, the first gas passage 51 may be provided on an outer circumference of the first fluid passage 71 and/or the container 10. The pack body 21 may have an opening to accommodate the first fluid passage 71, or may be structured to define the first fluid passage 71.

The second fluid passage 72 may be spaced apart from the second gas passage 53 in the lid 40. The second fluid passage 72 may include a vertical part or vertical portion 72A lengthily or longitudinally provided in a vertical or transverse direction and a horizontal part or horizontal portion 72B lengthily or longitudinally provided in a horizontal or lateral direction when the lid 40 closes the container 10. However, this embodiment is not limited thereto. For example, the second fluid passage 72 may vary in shape as necessary. For example, the second fluid passage 72 may have a curved tube shape or be provided with only the vertical portion.

Alternatively, the vertical portion 72A of the second fluid passage 72 may be provided inside the vertical portion 53A of the second gas passage 53 of the fermentation lid 40. That is, the vertical portion 53A of the second gas passage 53 may be provided on an outer circumference of the vertical portion 72A of the second fluid passage 72 and the lid 40. When the lid 40 closes the container 10, the second fluid passage 72 may communicate with the first fluid passage 71. The vertical portion 72A of the second fluid passage 72 may communicate with the first fluid passage 71.

The first fluid passage 71 and the second fluid passage 72, which communicate with each other, may constitute the fluid passage 70 together with each other. When the lid 40 closes the container 10, each of the first fluid passage 71 and the second fluid passage 72 may have a cross-sectional area less than that of each of the first gas passage 51 and the second gas passage 53 so that the first fluid passage 71 and the second fluid passage 72 are easily connected to each other.

The second fluid passage 72 may extend to the outer circumference of the lid 40 or be provided in only the inside of the lid 40. In addition, the second fluid passage 72 may be connected to a separate external passage 4. A structure in which the second fluid passage 72 is connected to the external passage 4 will be described as an example.

Figure 4:
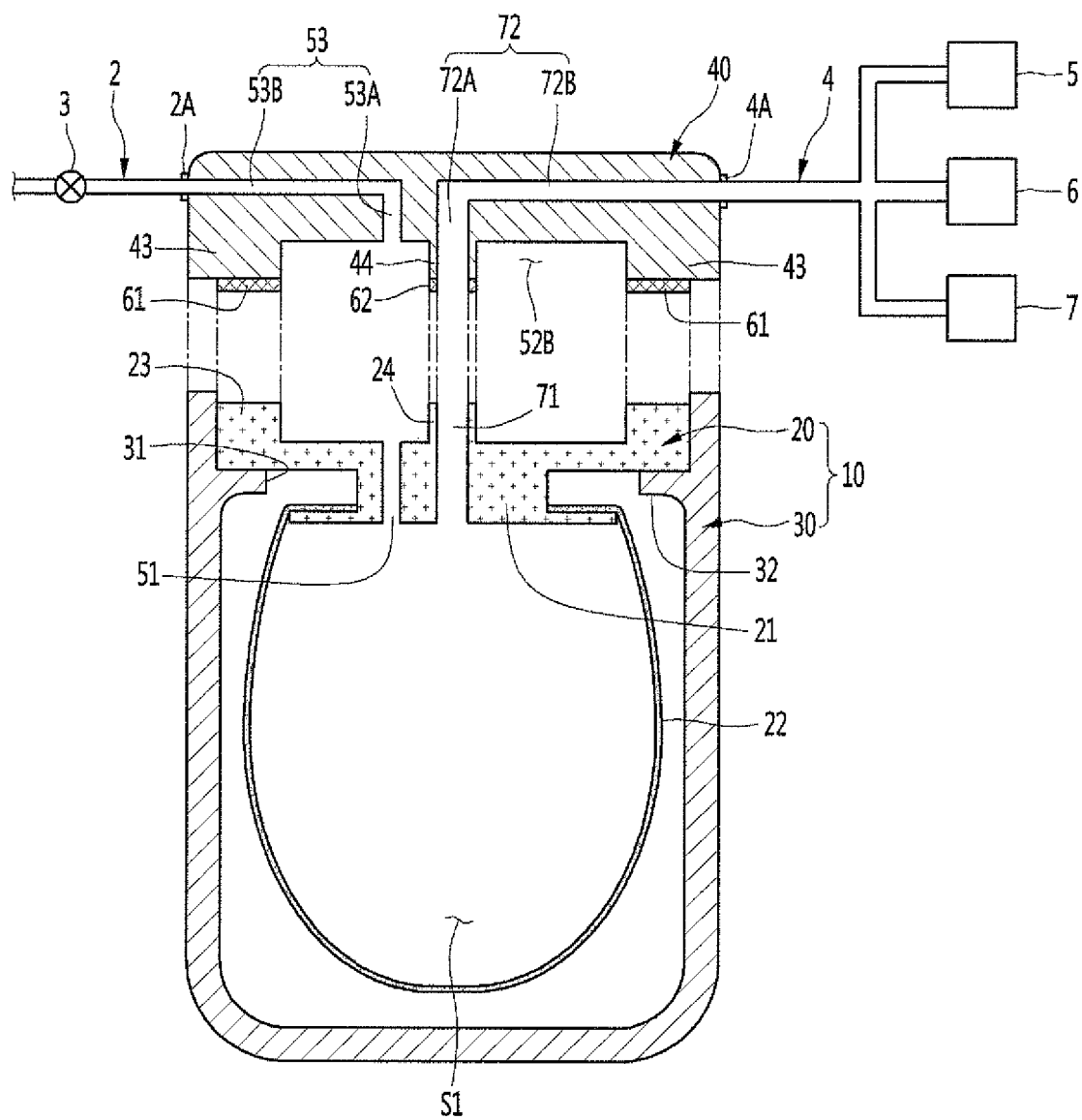
FIG. 4 is a cross-sectional view illustrating a state in which a fermentation lid of a fermenter is opened according to an embodiment.
Figure 5:
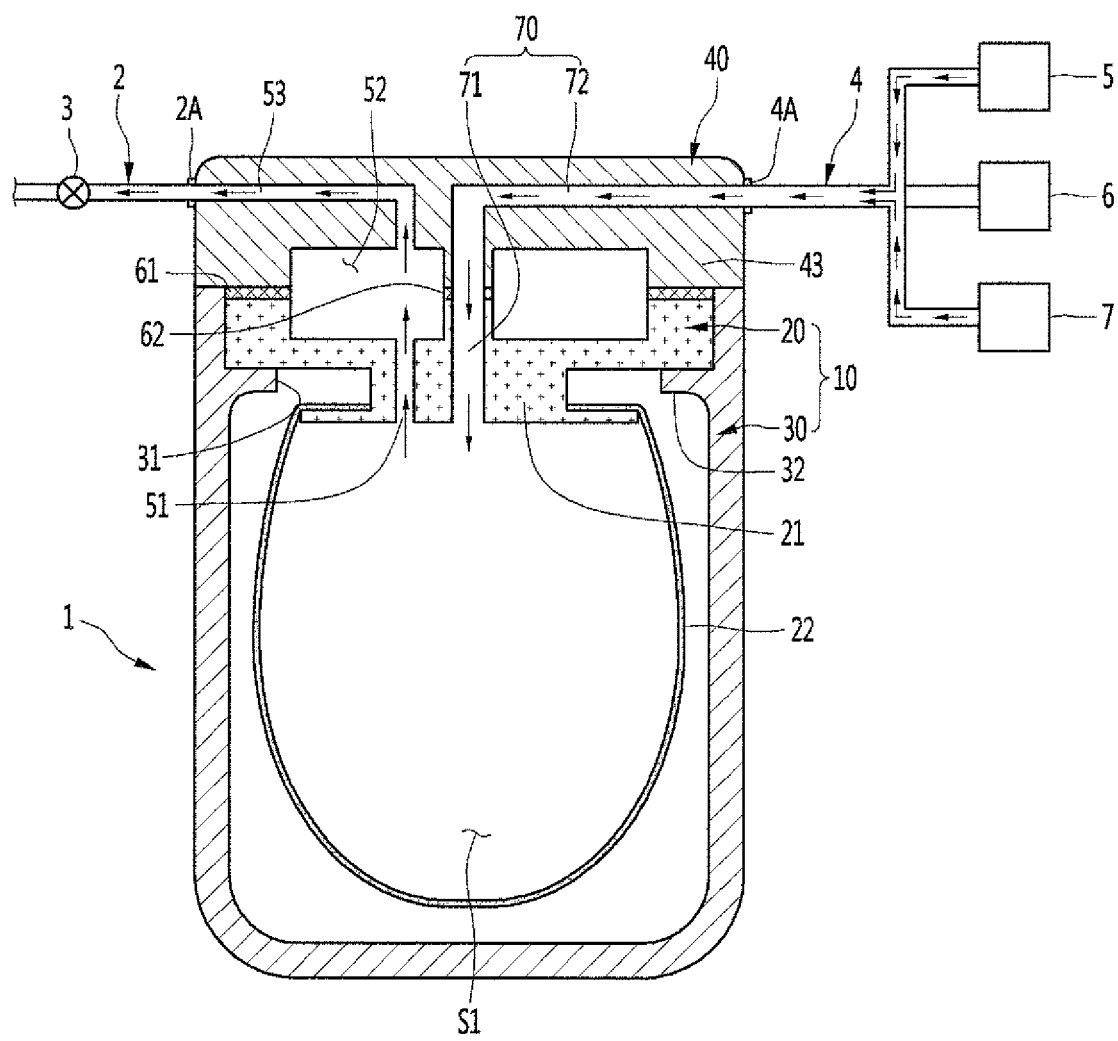
FIG. 5 is a view illustrating a flow of a fluid introduced through a main passage and a flow of a gas discharged through a gas passage when the fermentation lid of the fermenter of FIG. 4 is closed.
Figure 6:
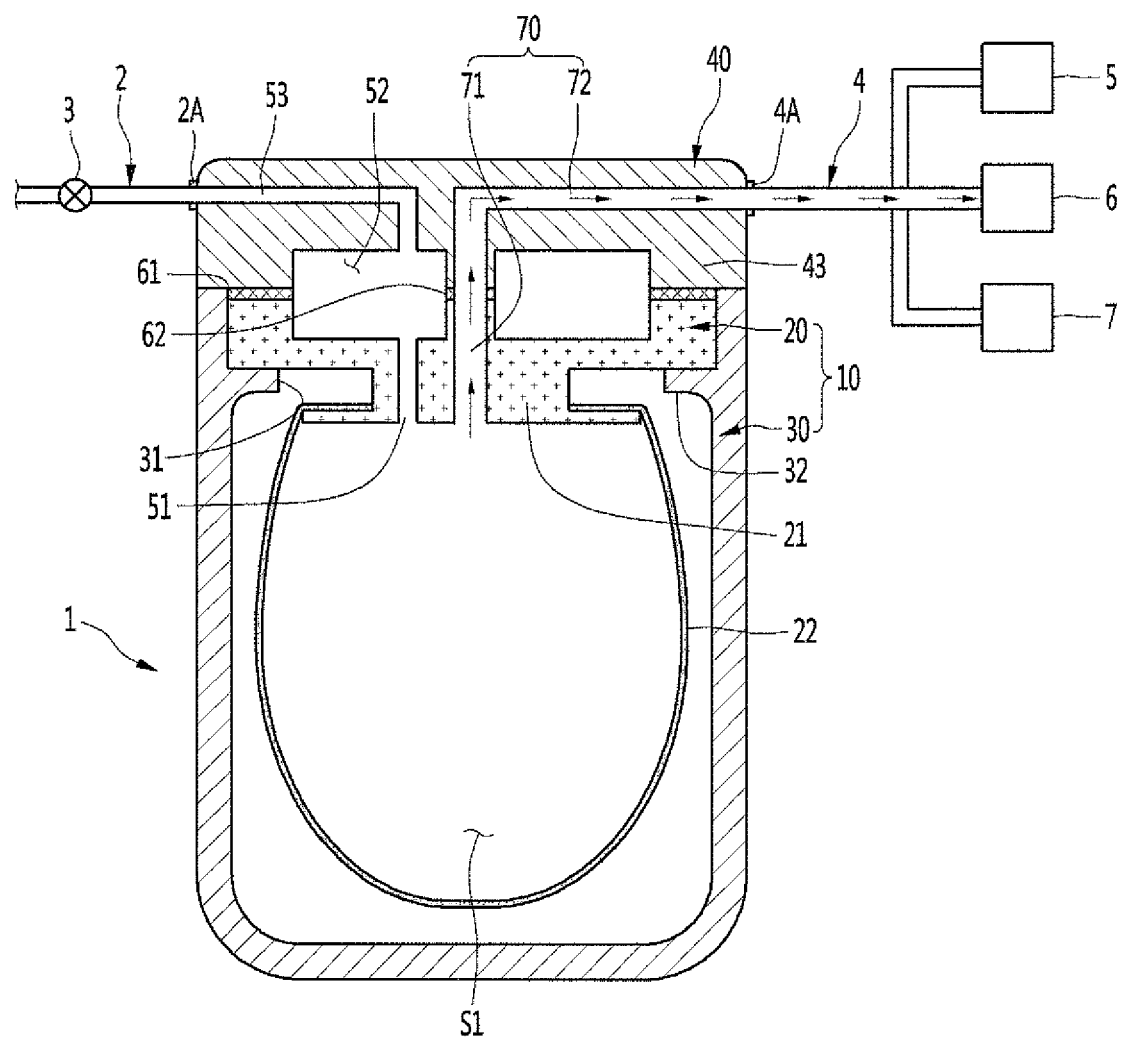
FIG. 6 is a view illustrating a flow of a beverage dispensed through the main passage when the fermentation lid of the fermenter of FIG. 4 is closed.
Figure 7:
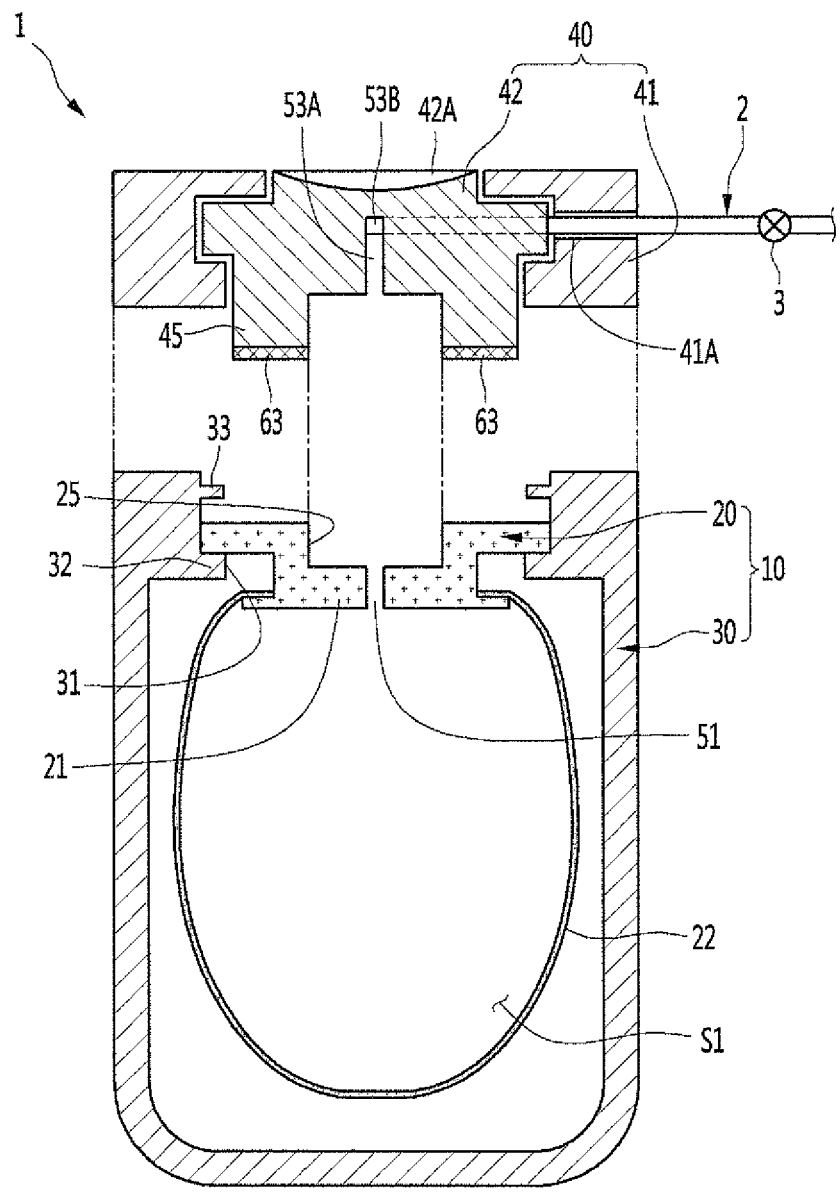
FIG. 7 is a cross-sectional view illustrating a state in which a fermentation lid of a fermenter is opened according to an embodiment.

A second connection part or second connector 4A between the external passage 4 and the second fluid passage 72 may be provided on an outer circumference of the lid 40 as illustrated in FIGS. 4 to 6. However, this embodiment is not limited thereto. For example, the external passage 4 may be inserted into the lid 40 and connected to the second fluid passage 72. In this case, the second connector 4A between the external passage 4 and the second fluid passage 72 may be provided inside the lid 40.

The external passage 4 may be connected to at least one constituent that is required in making a beverage. The at least one constituent may be provided outside the fermenter 1. For example, the external passage 4 may be branched to be connected to each of a water supply part or water supplier 5, a dispensing part or dispenser 6, and a material supply part or material supplier 7.

The water supplier 5 may be configured to supply water to the space S1 of the fermenter 1 and include a water tank. The water supplier 5 may directly supply water. The dispenser 6 may be configured to dispense a finished or completed beverage that is fermented in the space S1 of the fermenter 1 and may include a tap, spout, or dispensing valve, for example. The material supplier 7 may be configured to supply a material or ingredient that is required in fermentation of the beverage. When the beverage made in the fermenter 1 is beer, the ingredient or material may be malt, wort, hops, oil, yeast, etc. In addition, the material supplier 7 may supply an ingredient or material that is mixed with water.

As illustrated in FIG. 5, when a fluid such as water or a mixture is introduced into the fermenter 1, the water supplier 5 and/or the material supplier 7 may guide the fluid to the fermenter 1 through the external passage 4. Thus, the fluid may successively pass through the second fluid passage 72 and the first fluid passage 71 and then be introduced into the space S1. When the beverage made as illustrated in FIG. 6 is dispensed from the space S1 through the external passage 4, the beverage may successively pass through the first fluid passage 71 and the second fluid passage 72 to flow to the external passage and then may be dispensed through the dispenser 6.

Inner hollow parts or inner protrusions 24 and 44 may be provided in at least one of the beverage pack 20 or the lid 40. A structure in which the inner protrusions 24 and 44 are respectively defined in the beverage pack 20 and the lid 40 will be described as an example for convenience of description. The inner protrusions 24 and 44 may have a ring or donut shape such that they surround a circular space.

The container-side inner protrusion 24 may be defined in the beverage pack 20, and a lid-side inner protrusion 44 may be defined in the lid 40. The container-side inner protrusion 24 may protrude upward, and the lid-side inner protrusion 44 may protrude downward. The container-side inner protrusion 24 and the lid-side inner protrusion 44 may be provided at positions corresponding to each other. The container-side inner protrusion 24 may be provided inside the central or inner space 52A of the container-side outer protrusion 23 in a radial direction of the container 10. The lid-side inner protrusion 44 may be provided inside the inner or central space 52B of the lid-side outer protrusion 43 in a radial direction of the lid 40.

The first fluid passage 71 may include or be defined by an inner or central space of the container-side inner protrusion 24, and the second fluid passage 72 may include or be defined by an inner or central space of the lid-side inner protrusion 44. As the lid 40 closes the container 10, the container-side inner protrusion 24 and the lid-side inner protrusion 44 may contact each other or overlap each other in the vertical or transverse direction. However, this embodiment is not limited thereto. When the lid 40 closes the container 10, an outer circumferential surface of the lid-side inner protrusion 44 and an inner circumferential surface of the container-side inner protrusion 24 may contact each other.

The fermenter 1 according to this embodiment may further include a sealing or inner seal 62 that prevents fluid flowing to the fluid passage 70 from leaking between the first fluid passage 71 and the second fluid passage 72. The fluid passing through the fluid passage 70 may be prevented from leaking into the gas chamber 52 by the sealing 62. The outer seal 61 preventing the gas within the gas chamber 52 from leaking to the outside may be called a gas sealing or gas seal, and the outer seal 62 preventing the fluid flowing to the fluid passage 70 from leaking to the gas chamber 52 may be called a fluid sealing or fluid seal.

The fluid seal 62 may be made of a material having elasticity such as rubber, like the gas seal 61. The fluid seal 62 may be provided on at least one of the container-side inner protrusion 24 or the lid-side inner protrusion 44. When the lid 40 closes the container 10, the fluid seal 62 may be compressed between the container-side inner protrusion 24 and the lid-side inner protrusion 44 to improve a sealing effect and secure any contents of the container 10.

An operation of the fermenter 1 according to this embodiment will be described. A user may open the lid 40 to put the beverage pack 20 into the opening 31 of the tank 30 and then close the lid 40 to close container 10. Thereafter, the fluid within the water supplier 5 and the material supplier 7 may be introduced into the fermenter 1 through the external passage 4 to successively pass through the second fluid passage 72 and the first fluid passage 71. Then, the fluid may be introduced into the space S1 to start fermentation.

As fermentation progresses, gas may be generated in the space S1 within the beverage pack 20. An inner pressure of the space S1 may gradually increase to expand the pack container 22 and may reach an appropriate level of inner pressure or an optimum inner pressure. If gas is continuously generated even though an optimum inner pressure of the space S1 is reached, the gas may be introduced into the gas chamber 52 through the first gas passage 51, and the gas within the gas chamber 52 may be discharged to the outside of the fermenter 1 through the second gas passage 53 to maintain the optimum inner pressure.

If the second gas passage 53 is connected to the external gas passage 2, when a valve 3 is opened, the gas passing through the second gas passage 53 may be guided to the external gas passage 2 and then discharged. When fermentation is finished and the beverage is finished or complete, the user may dispense the beverage. The beverage contained in the space S1 may successively pass through the first fluid passage 71 and the second fluid passage 72 to flow to the external passage 4 and then be dispensed through the dispenser 6.

A fermenter according to an embodiment will be described with reference to FIGS. 7 to 10. Contents duplicated with the foregoing previous embodiments will be omitted, and differences will be mainly described. A lid 40 according to an embodiment may include an outer lid 41 and an inner lid 42. The outer lid 41 may be seated on the container 10.

The outer lid 41 may be configured to surround at least a portion of an outer circumferential surface of the inner lid 42. The inner lid 42 may be rotatably provided with respect to the outer lid 41. The outer lid 41 may be configured to restrict the inner lid 42 in a vertical or transverse direction. A second gas passage 53 may be provided in the inner lid 42. A handle 42A may be provided on an upper portion of the inner lid 42. A user may grasp the handle 42A to rotate the inner lid 42 in a clockwise direction or a counterclockwise direction.

A hollow part or a protrusion 45 and/or 25 may be defined in at least one of the beverage pack 20 or the fermentation lid 40, and an inner or central space of the protrusion 45 and/or 25 may define a gas chamber 52. Hereinafter, a container-side protrusion 25 may be defined in the beverage pack 20, and a lid-side protrusion 45 may be defined in the fermentation lid 40.

The lid-side protrusion 45 protruding downward from the lid 40 may be defined in the inner lid 42 of the lid 40. The container-side protrusion 25 may include or be adjacent to a portion that recesses downward, and may be defined in a top surface of the beverage pack 20. The lid-side protrusion 45 and the container-side protrusion 25 may be provided in positions corresponding to each other. The lid-side protrusion 45 and/or the step portion 25 may be ring or donut shaped. When the lid 40 closes the container 10, the lid-side protrusion 45 may contact a top surface of the beverage pack 20 or vertically overlap the beverage pack 20. However, this embodiment is not limited thereto. When the lid 40 closes the container 10, an outer circumferential surface of the lid-side protrusion 45 and an inner circumferential surface of the container-side protrusion 25 may contact each other.

When the lid 40 closes the container 10, the gas chamber 52 may be provided between the inner lid 42 and the container 10. The inner space defined by the lid-side protrusion 45 and the inner space defined by the container-side protrusion 25 of the beverage pack 20 may constitute the gas chamber 52 together with each other. The second gas passage 53 may be provided in the inner lid 42 of the lid 40. Thus, when the outer lid 41 and the inner lid 42 close the container 10, the gas chamber 52 may be provided between the container 10 and the inner lid 42.

A through-hole 41A may be defined in the outer lid 41. An external gas passage 2 may be inserted into the through-hole 41A to communicate with a second gas passage 53 of the inner lid 42. A predetermined gap 41B may be defined between an inner circumference of the outer lid 41 and an outer circumference of the inner lid 42. At least a portion of the external gas passage 2 may be inserted into the gap. Thus, a connection between the external gas passage 2 and the second gas passage 53 may be maintained to easily rotate the inner lid 42. The external gas passage 2 may be made out of a flexible material such that a portion of the external gas passage in the gap 41B may easily accommodate rotation of the inner lid 42.

Figure 8:
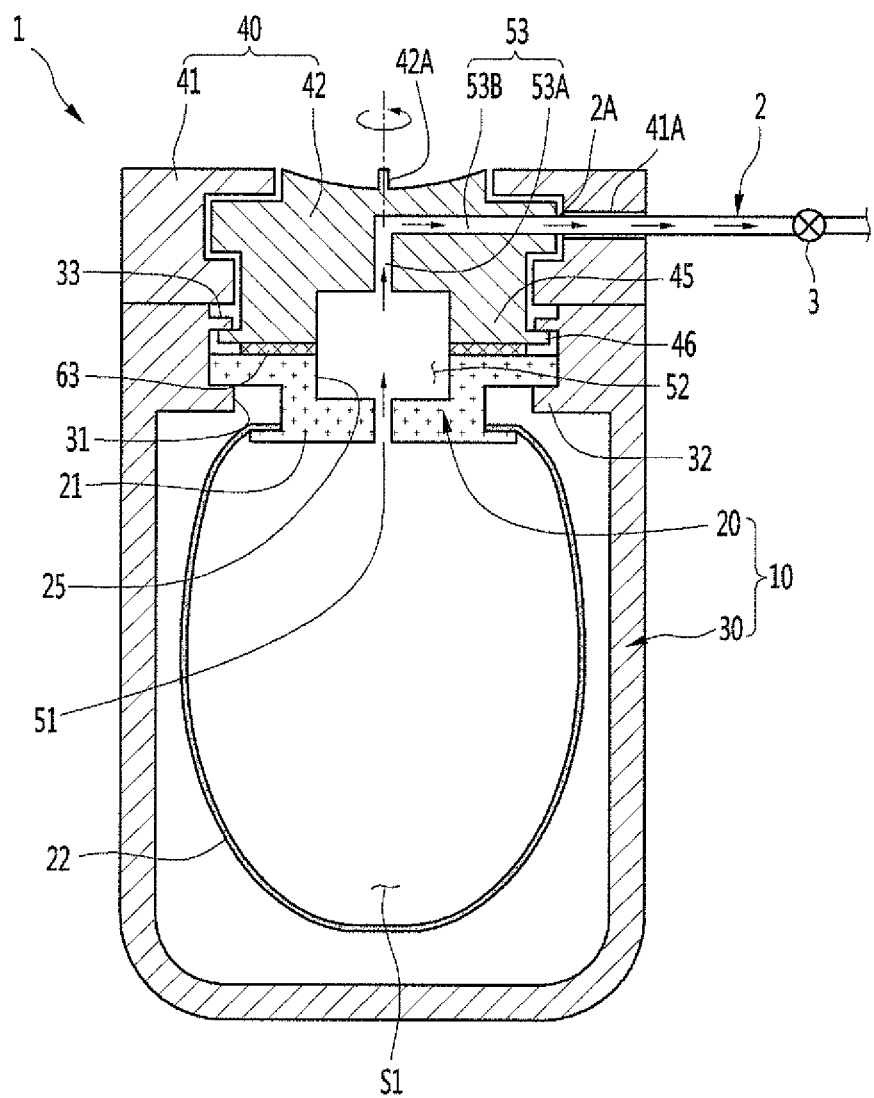
FIG. 8 is a view illustrating a flow of a gas discharged through a gas passage when the fermentation lid of FIG. 7 is closed and locked.
Figure 9:
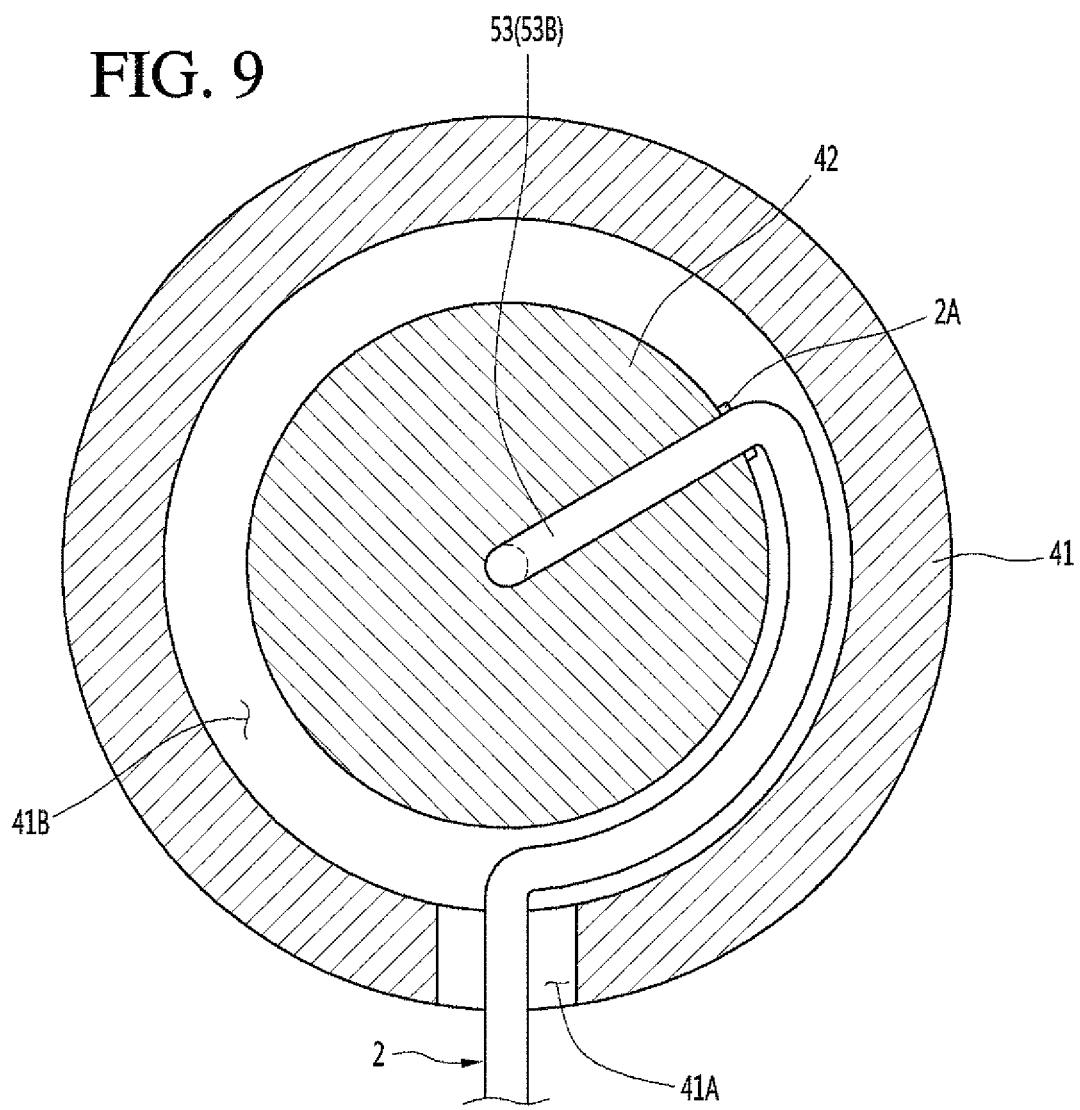
FIG. 9 is a transverse cross-sectional view illustrating a state in which the fermentation lid of a fermenter of FIG. 7 is unlocked.
Figure 10:
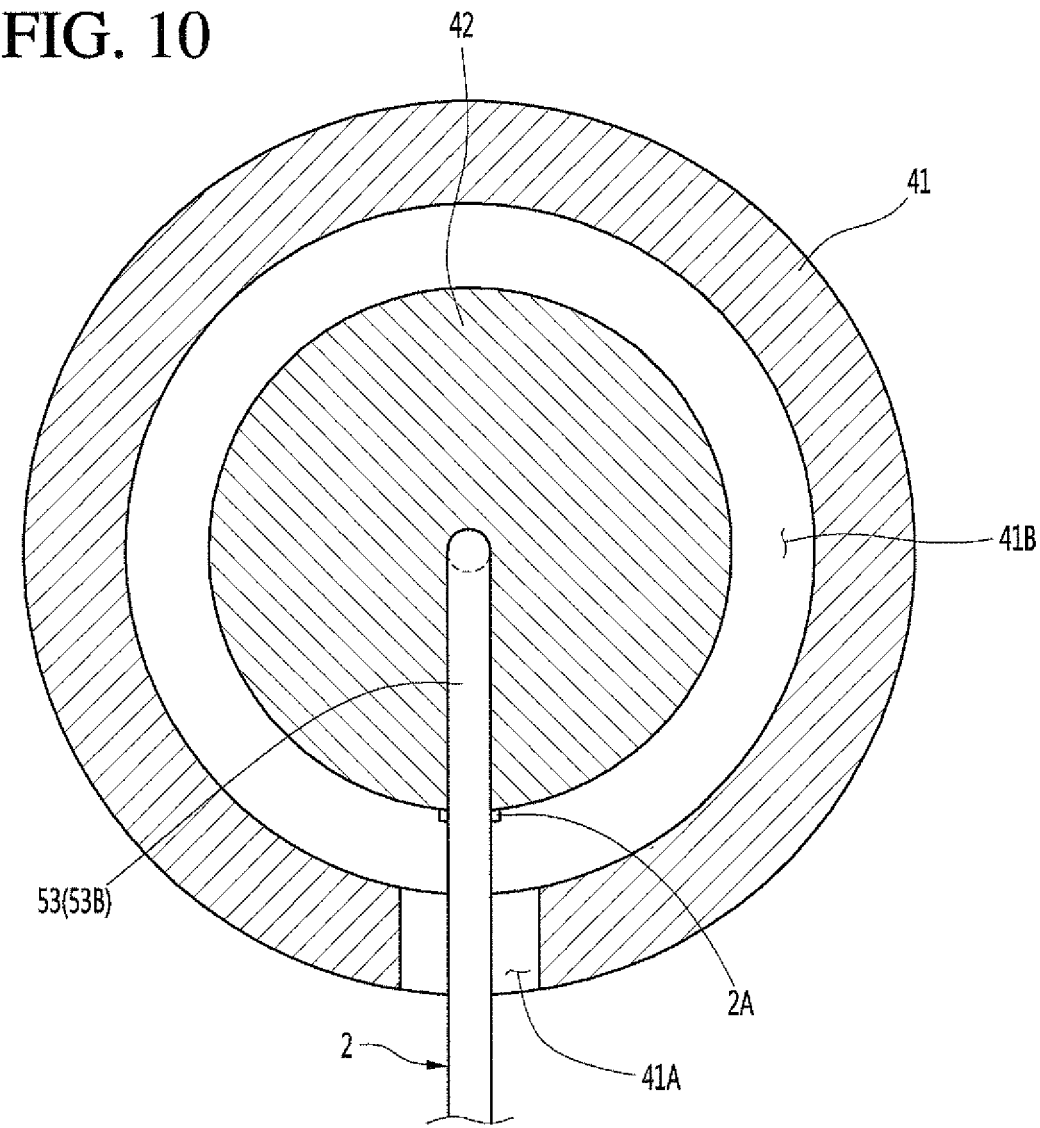
FIG. 10 is a transverse cross-sectional view illustrating a state in which the fermentation lid of the fermenter of FIG. 7 is locked.

A connection part or connector 2A between the external gas passage 2 and the second gas passage 53 may be provided on the outer circumference of the inner lid 42 as illustrated in FIGS. 8 to 10. However, this embodiment is not limited thereto. For example, the external gas passage 2 may be inserted into the inner lid 42 and connected to the second gas passage 53. In this case, the connector 2A between the external gas passage 2 and the second gas passage 53 may be provided inside the inner lid 42.

The through-hole 41A of the outer lid 41 may be defined in a position corresponding to an outlet of the second gas passage 53 when the inner lid 42 rotates to be in a locked state. Thus, a connector 2A between the second gas passage 53 and the external gas passage 2 may be closest to the through-hole 41A when the lid 40 is in the locked state.

At least one locking part or lock 46 coupled to the container 10 when the inner lid 42 rotates in a first direction (for example, a clockwise direction) may be provided on the inner lid 42 of the lid 40. The at least one lock 46 may protrude outward from an outer circumferential surface of the inner lid 42. A lid-side protrusion 45 may protrude downward from the inner lid 42, and the at least one lock 46 may protrude outward from an outer circumferential surface of the lid-side protrusion 45.

At least one hook part or hook 33 restricting the lock 46 may be provided on the container 10. The at least one hook 33 may be provided on the tank 30 to protrude inward from an inner circumference of an upper portion of the tank 30. The at least one hook 33 may be provided above an opening 31 and a support 32. The at least one lock 46 may lengthily or longitudinally extend in a circumferential direction of the outer circumferential surface of the inner lid 42. The at least one hook 33 may lengthily extend along an inner circumference of the fermentation tank 30.

The at least one lock 46 may have a length greater than a distance between a protruding end of the first hook 33 and the outer circumferential surface of the inner lid 42, and may have a length less than a distance between the inner circumferential surface of the container 10 and the outer circumferential surface of the inner lid 42. That is, the length of the at least one lock 46 may pass through a gap between the container 10 and the inner lid 42 when the inner lid is inserted into the container 10. The length of the at least one lock 46 may not pass through a gap between the first hook 33 and the inner lid 42.

When the fermenter 1 is in a locked state, the lock 46 of the lid 40 may be provided below the first hook 33 of the container 10 to restrict the lid 40 in the vertical or transverse direction so that the lid 40 is not opened.

In the locked state, when the inner lid 42 rotates in a second direction (for example, the counterclockwise direction), the fermenter 1 may be unlocked. In this case, the lock 46 may be separated from the hook 33 such that it is not inline with a gap between the first hook 33 and the inner lid 42. That is, the lid 40 may not be restricted in the vertical or transverse direction. In this state, when the lid 40 moves upward, the lock 46 and the inner lid 42 may easily move upward out of the container 10 and thus be completely separated from the container 10.

A sealing or seal 63 preventing a gas within the gas chamber 52 from leaking between the inner lid 42 and the container 10 may be provided on at least one of the inner lid 42 or the container 10. When the lid 40 closes the container 10, the seal 63 may be compressed between the inner lid 42 and a top or upper surface of the beverage pack 20. In addition, a separate sealing or seal (not shown) that is compressed between the tank 30 and the outer lid 41 of the lid 40 may be further provided.

An operation of the fermenter 1 according to this embodiment will be described. A user may open the lid 40 to put the beverage pack 20 into the opening 31 of the tank 30. Here, a fermentation material or ingredient may be contained in the beverage pack 20. Thereafter, the user may close the lid 40.

While the lid 40 is closed, the lock 46 of the lid 40 may move downward past the location of a hook 33 of the container 10. The fermenter 1 may still be in the unlocked state. Thereafter, the user may grasp the handle 42A to rotate the inner lid 42, the lock 46 may move downward from the hook 33, and then the lock 46 may hook with the hook 33 in an upward direction. Thus, the fermenter 1 may become in a locked state, and the container 10 may be completely closed. Thereafter, fermentation may start.

As fermentation progresses, gas may be generated in the space S1 within the beverage pack 20. Thus, an inner pressure of the space S1 may gradually increase to expand the pack container 22 and may reach an appropriate or optimum level of inner pressure.

If gas is continuously generated even though the inner pressure of the space S1 reaches the optimum level, the gas may be introduced into the gas chamber 52 through the first gas passage 51, and the gas within the gas chamber 52 may be discharged to the outside of the fermenter 1 by successively passing through the second gas passage 53 and the external gas passage 2. The inner pressure may thus be maintained at the optimum level.

Figure 11:
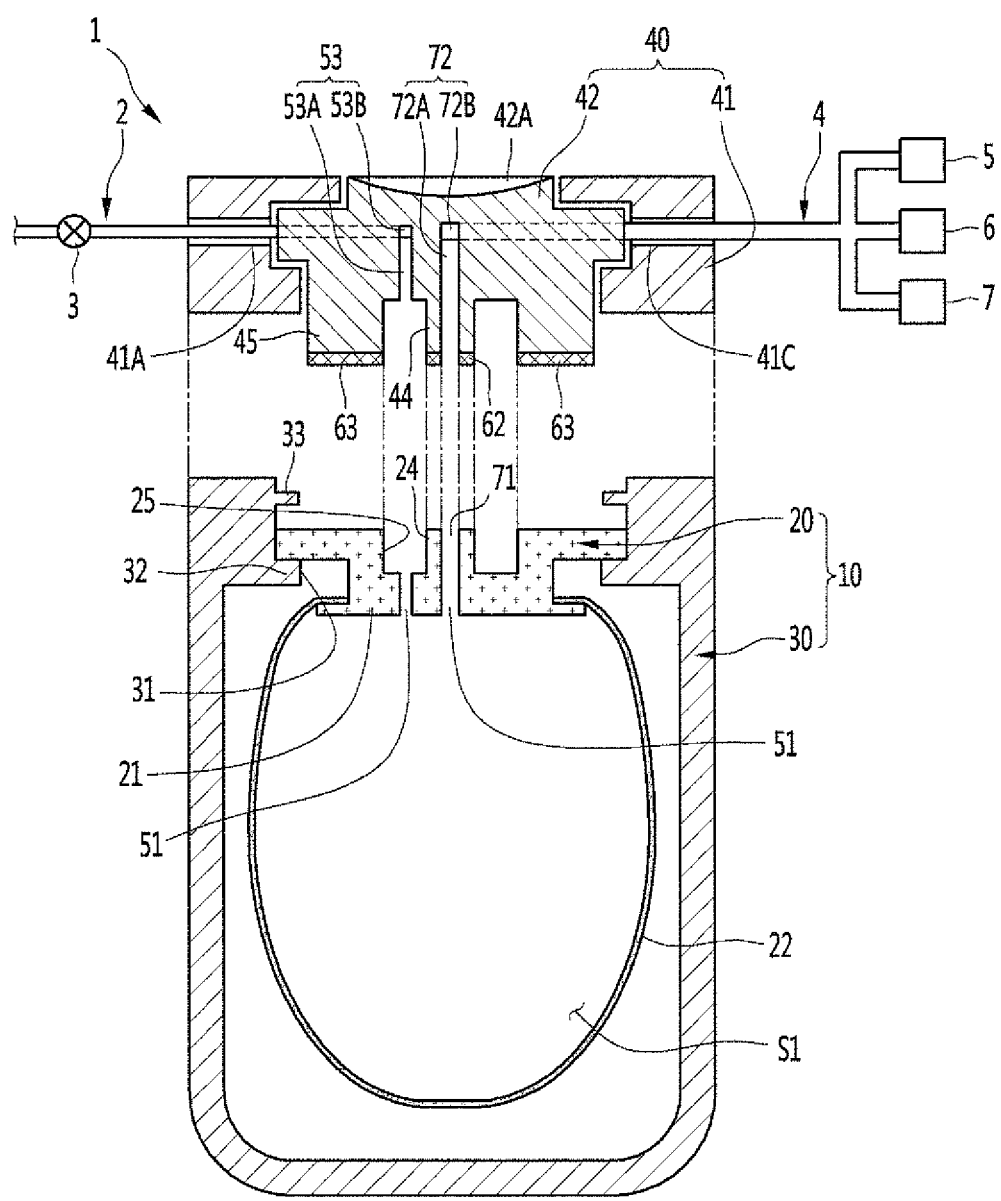
FIG. 11 is a cross-sectional view illustrating a state in which a fermentation lid of a fermenter is opened.
Figure 15:
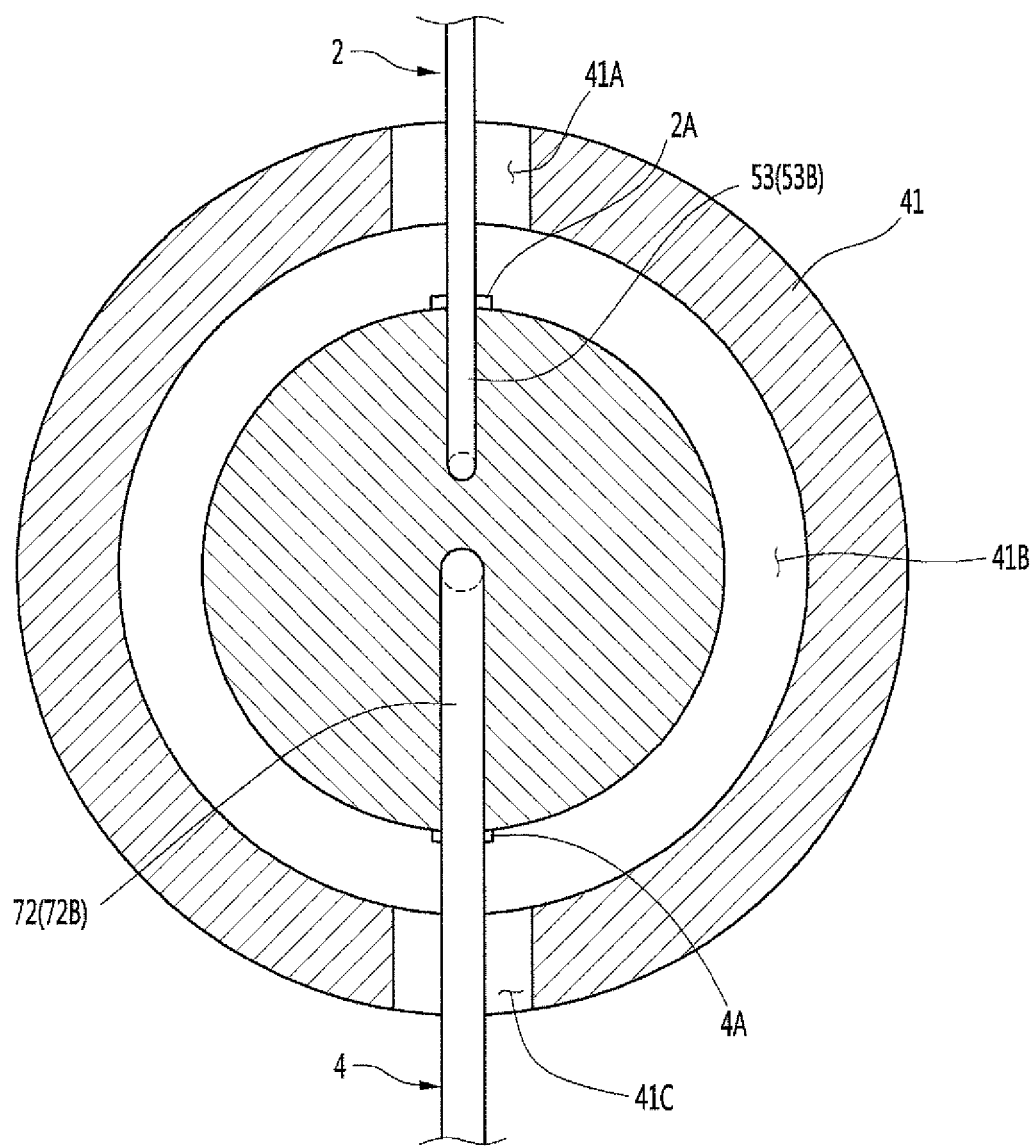
FIG. 15 is a transverse cross-sectional view illustrating a state in which the fermentation lid of the fermenter of FIG. 11 is locked.

A fermenter according to an embodiment will be described with reference to FIGS. 11 and 15. Contents duplicated with the foregoing previous embodiments will be omitted, and differences will be mainly described.

A beverage making pack 20 of a fermenter 1 may further include a first main passage or a first fluid passage 71 spaced apart from a first gas passage 51, and an inner lid 42 may further include a second main passage or a second fluid passage 72 spaced apart from a second gas passage 53.

When a fermentation lid or lid 40 closes a fermentation container or container 10, the first fluid passage 71 and the second fluid passage 72 may communicate with each other to constitute the fluid passage 70.

A first through-hole or gas through-hole 41A into which an external gas passage 2 is inserted may be defined in an outer lid 41, and a second through-hole, main through-hole, or fluid through-hole 41C into which an external passage 4 is inserted may be further defined in the outer lid 41. The gas through-hole 41A and the fluid through-hole 41C may be spaced apart from each other. The external passage 4 may be inserted into the fluid through-hole 41C, and an inner lid 42 may communicate with the second fluid passage 72.

At least a portion of the external passage 4 may be inserted into a gap 41B. Thus, the connection between the external passage 4 and the second fluid passage 72 may be maintained to allow the inner led 42 to easily rotate. In this case, each of the external gas passage 2 and the external passage 4 may be made of a flexible material.

A gas or first connection part or first connector 2A may be provided on an outer circumference of the inner lid 42. In addition, a fluid or second connection part or second connector 4A of the external passage 4 and the second fluid passage 72 may be provided on an outer circumference of the inner lid 42. However, the embodiment is not limited thereto. For example, the external passage 4 may be inserted into the inner lid 42 and connected to the second fluid passage 72. In this case, the second connector 4A of the external passage 4 and the second fluid passage 72 may be provided inside the inner lid 42.

Figure 12:
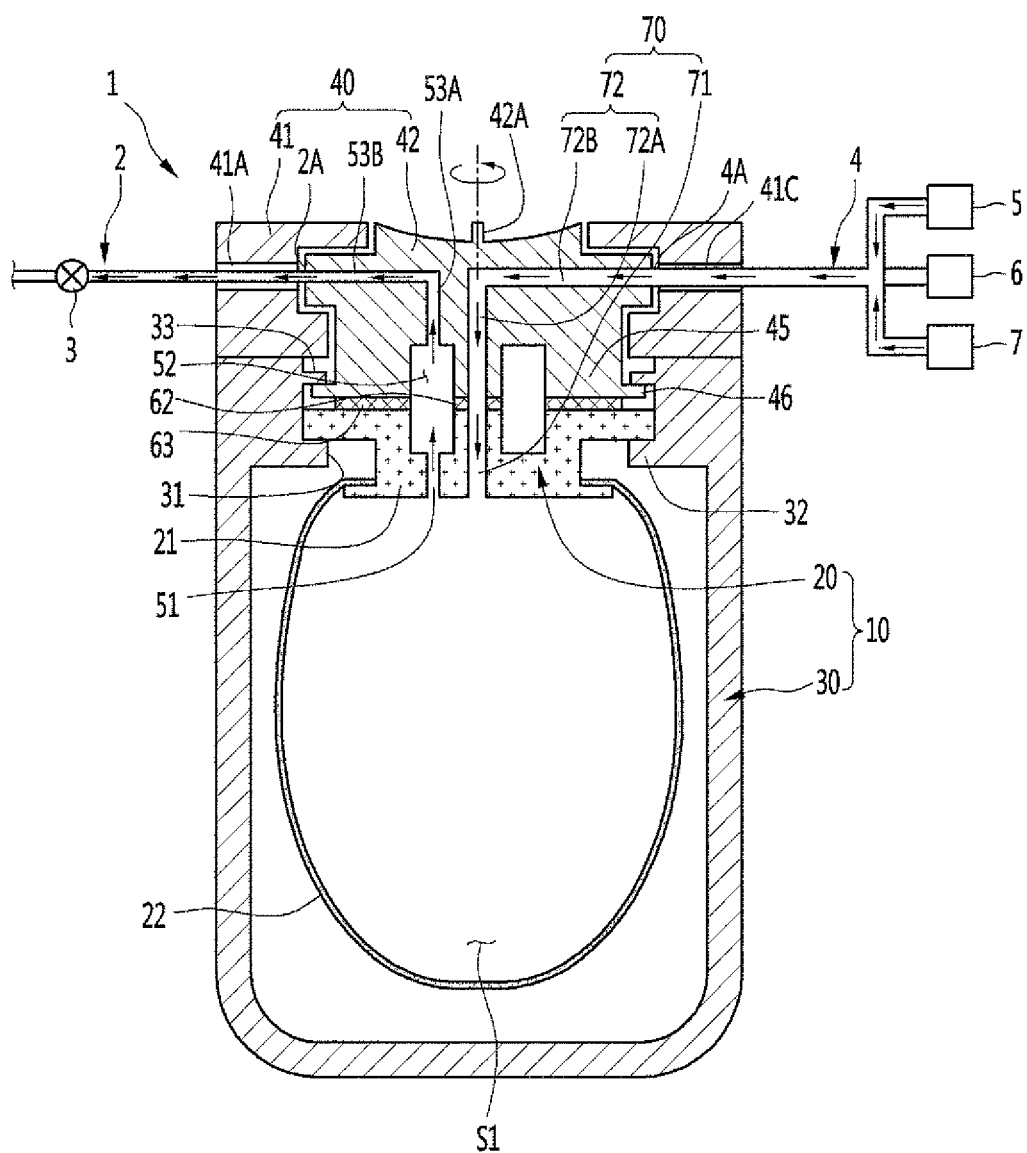
FIG. 12 is a view illustrating a flow of a fluid introduced through a main passage and a flow of a gas discharged through a gas passage when the fermentation lid of the fermenter of FIG. 11 is closed and locked.
Figure 13:
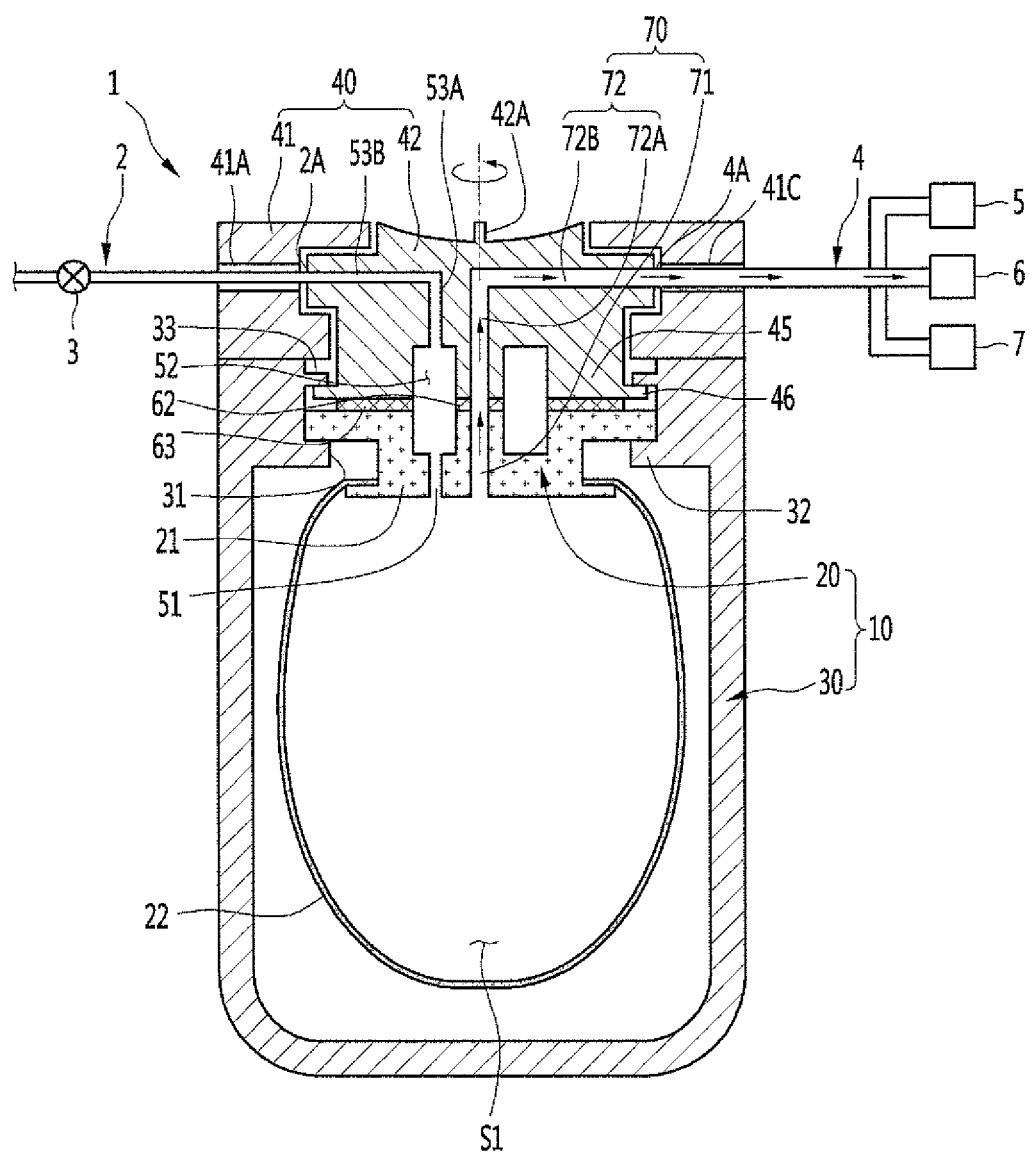
FIG. 13 is a view illustrating a flow of a beverage dispensed through the main passage when the fermentation lid of the fermenter of FIG. 11 is closed and locked.
Figure 14:
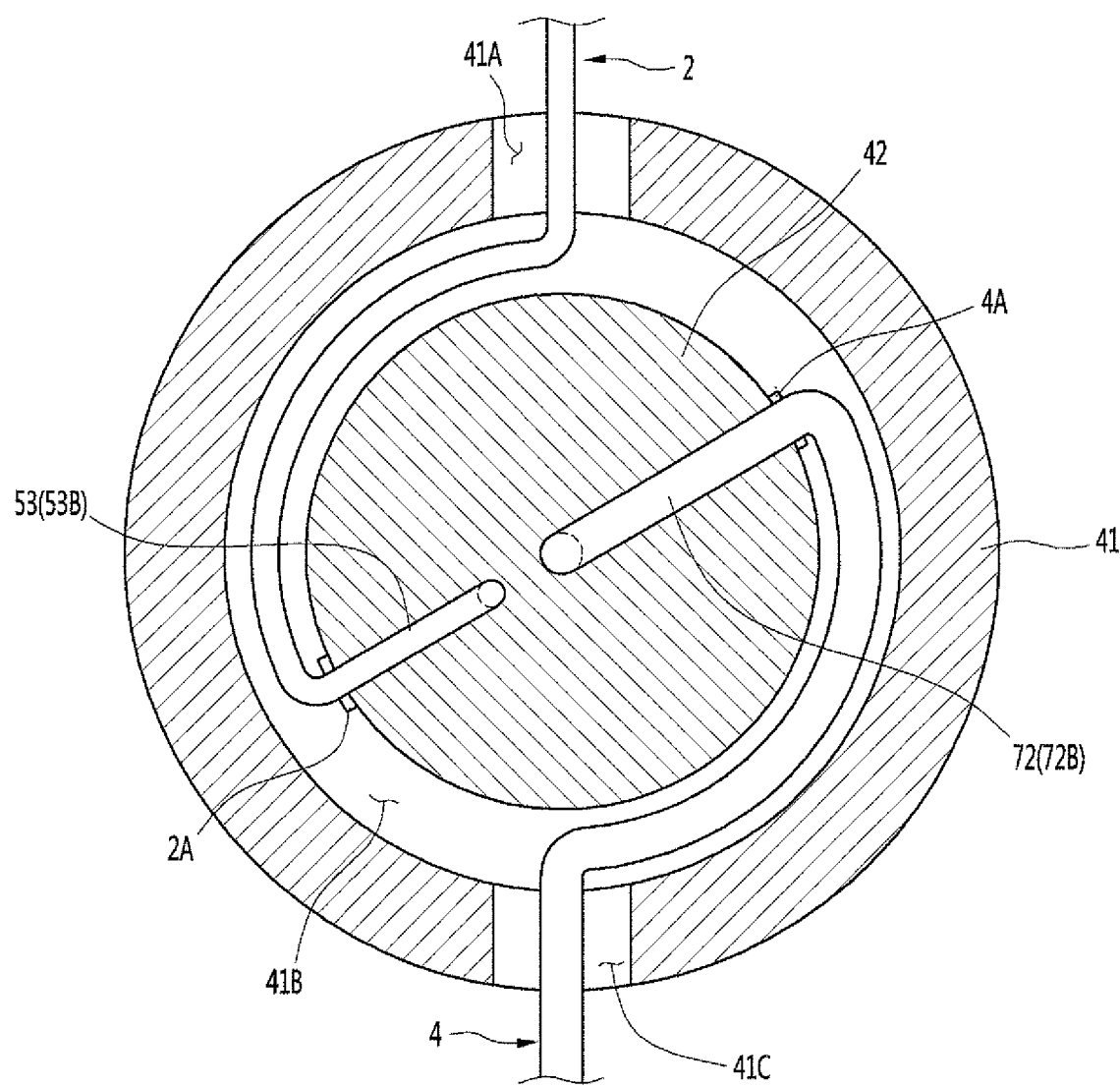
FIG. 14 is a transverse cross-sectional view illustrating a state in which the fermentation lid of a fermenter of FIG. 11 is unlocked.

The second connector 4A of the external passage 4 and the second fluid passage 72 may be spaced apart from the first connector 2A of the external gas passage 2 and the second gas passage 53. Referring to FIGS. 12 and 15, the second through-hole 41C of the outer lid 41 may be provided at a position corresponding to an outlet of the second fluid passage 72 when the inner lid 42 rotates to be locked. Thus, the connection part 4A of the external passage 4 and the second main passage 72 may be closest to the second through-hole 41C when the fermentation lid 40 is locked.

Figure 16:
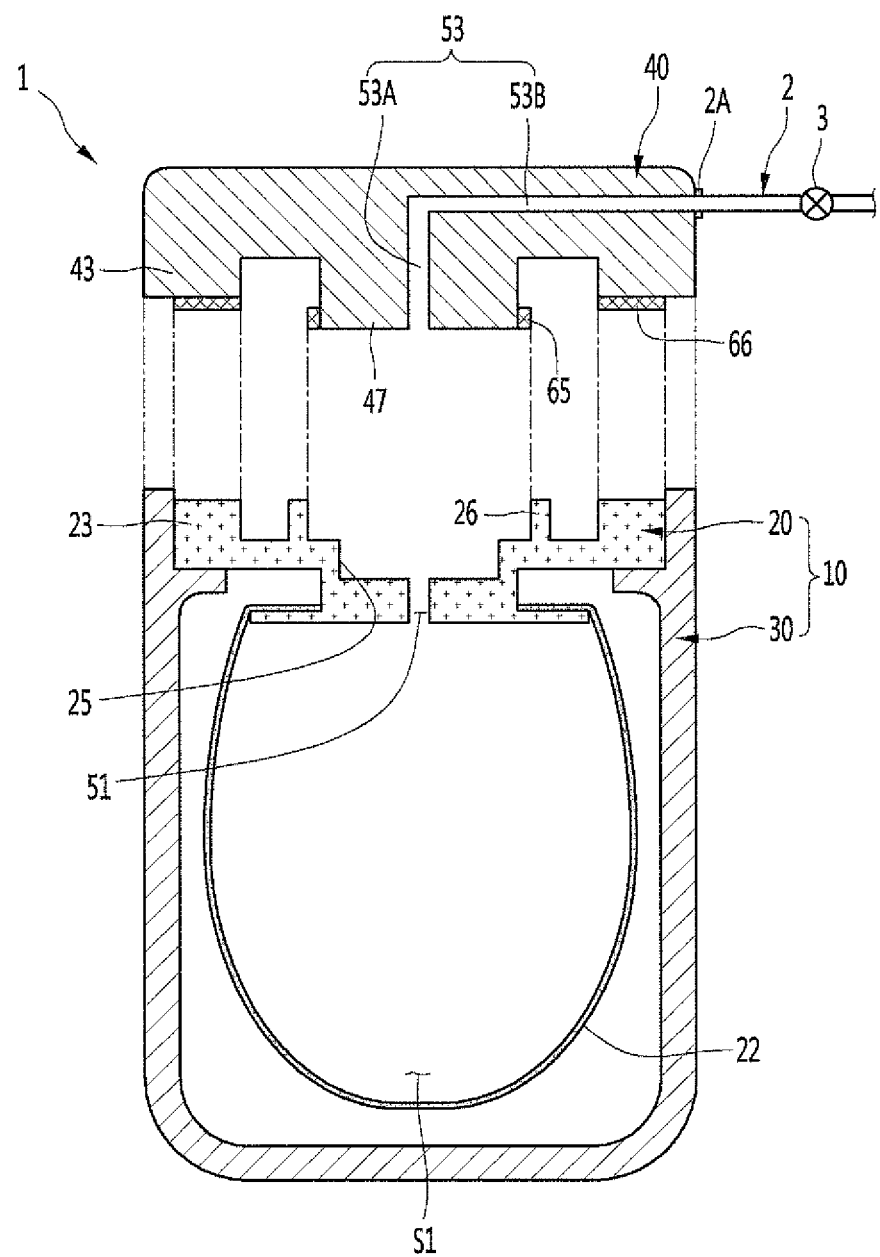
FIG. 16 is a cross-sectional view illustrating a state in which a fermentation lid of a fermenter is opened according to an embodiment.
Figure 17:
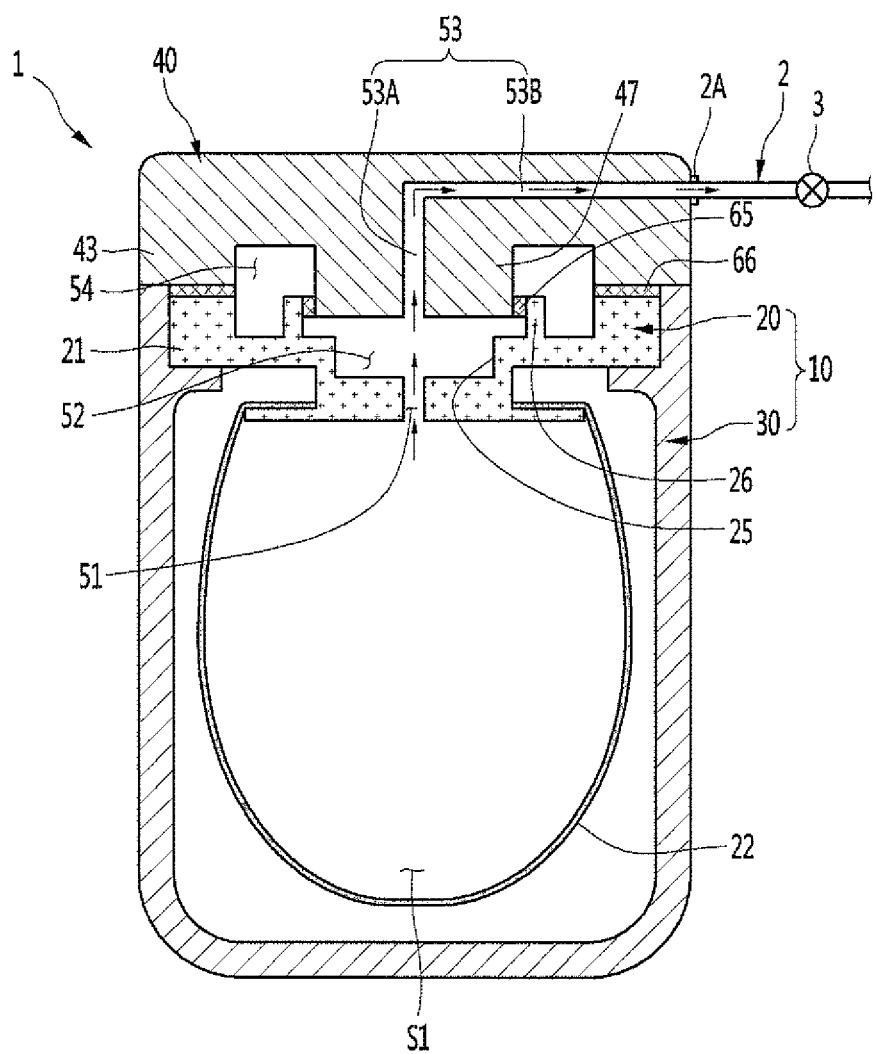
FIG. 17 is a view illustrating a flow of a gas discharged through a gas passage when the fermentation lid of the fermenter of FIG. 16 is closed.

A fermenter according to an embodiment will be described with reference to FIGS. 16 and 17. Contents duplicated with the foregoing previous embodiments will be omitted, and differences will be mainly described. A grasp part, grip, inner protrusion, or inner container-side protrusion 26 protruding upward may be provided on the beverage pack 20 of the fermenter 1 according to this embodiment. The user may grasp the inner protrusion 26 to easily mount or separate the beverage pack 20 on or from the fermentation tank 30.

A portion of a top surface of the beverage pack 20 may protrude upward to form the inner container-side protrusion 26. At least a portion of the inner protrusion 26 may be provided inward toward the gas chamber 52 rather than outward in an inner space defined by an inner circumferential surface of an outer container-side hollow part or outer container-side protrusion 23. The inner container-side protrusion 26 may have a hollow shape or may form a hollow cross-section. When the lid 40 closes the container 10, an inner or central space, or third space, defined by the inner container-side protrusion 26 may be included in a gas chamber 52 or communicate with the gas chamber 52.

An inner recess part, inner recess, or step portion 25 may be defined in the beverage pack 20. An inner space of the inner container-side protrusion 26 and an inner space defined by an inner circumferential surface of the step portion 25 may communicate with each other, and be covered by a lid-side inner protrusion 47 of the lid 40 to form the gas chamber 52. The lid-side inner protrusion 47 protruding downward may be provided on the lid 40. A portion of a bottom surface of the lid 40 may protrude downward to form the lid-side inner protrusion 47. At least a portion of the lid-side inner protrusion 47 may be provided inside the inner space of the outer lid-side protrusion 43.

When the lid 40 closes the container 10, the inner lid-side protrusion 47 and/or the lid 40 may cover the inner space of the inner container-side protrusion 26 to form the gas chamber 52. At least a portion of the second gas passage 53 may be provided in the inner lid-side protrusion 47. The inner container-side protrusion 26 of the beverage pack 20 and the inner lid-side protrusion 47 of the lid 40 may be provided at positions corresponding to each other. That is, the inner container-side protrusion 26 of the beverage pack 20 may be provided at a position that corresponds to an outer side of the inner lid-side protrusion 47 such that the inner lid-side protrusion 47 covers the inner space of the inner container-side protrusion 26 and the inner space of the step portion 25.

When the lid 40 closes the container 10, at least a portion of the inner lid-side protrusion 47 of the lid 40 may be inserted into the inner container-side protrusion 26 of the beverage pack 20. That is, the inner lid-side protrusion 47 may be inserted into the inner space of the inner lid-side protrusion 26. However, this embodiment is not limited thereto. When the lid 40 closes the container 10, a bottom surface or lower outer surface of the inner lid-side protrusion 47 may come into contact with a top surface or an upper outer surface of the inner container-side protrusion 26.

When the lid 40 closes the container 10, a buffer space 54 or fourth space may be defined between the beverage pack 20 and the lid 40. The buffer space 54 may be provided in a space that is within the lid and the beverage pack, but outside of the inner container-side protrusion 26 and outside of the inner lid-side protrusion 47 and spaced apart from the gas chamber 52. The buffer space 54 may be a space that is separated from the gas chamber 52 to immediately hold any gas if the gas chamber 52 leaks to prevent the gas from leaking to the outside of the fermenter 1. A space between the outer lid-side protrusion 43 and the inner lid-side protrusion 47 of the lid 40 and a space between the outer container-side protrusion 23 and the inner container-side protrusion 26 of the beverage pack 20 may form the buffer space 54 together with each other. Thus, the buffer space may have an approximately donut shape or torus shape.

The gas chamber 52 may be called a first space, and the buffer space 54 may be called a second space. The fermenter 1 according to an embodiment may further include a first sealing or a first seal 65 preventing gas within the gas chamber 52 from leaking to the buffer space 54, and a second sealing or second seal 66 preventing the gas within the buffer space 54 from leaking to the outside.

Each of the first seal 65 and the second seal 66 may be made of a material having elasticity such as rubber. Each of the first seal 65 and the second seal 66 may be provided on at least one of the lid 40 or the container 10. The first seal 65 may be provided on at least one of the inner container-side protrusion 26 or the inner lid-side protrusion 47, and the second seal 66 may be provided on at least one of the outer container-side protrusion 23 or the outer lid-side protrusion 43.

The first seal 47 may be compressed between an outer circumferential surface of the inner lid-side protrusion 47 and an inner circumferential surface of the inner container-side protrusion 26 to seal gas inside of the beverage pack 20 in the container 10, and the second seal 66 may be compressed between a bottom surface of the outer lid-side protrusion 43 and a top surface of the outer container-side protrusion 23 to seal gas inside of the beverage pack 20 in the container 10. However, this embodiment is not limited to the position of each of the seals 65 and 66. For example, the position of the seal may vary according to the coupling relationship between the lid 40 and the container 10.

The security of the fermenter 1 may be doubly improved by the first seal 65 and the second seal 66. In addition, the buffer space 54 may be provided between the first seal 65 and the second seal 66 in a direction in which the gas leaks. Thus, the security of the fermenter 1 may be more improved.

Figure 18:
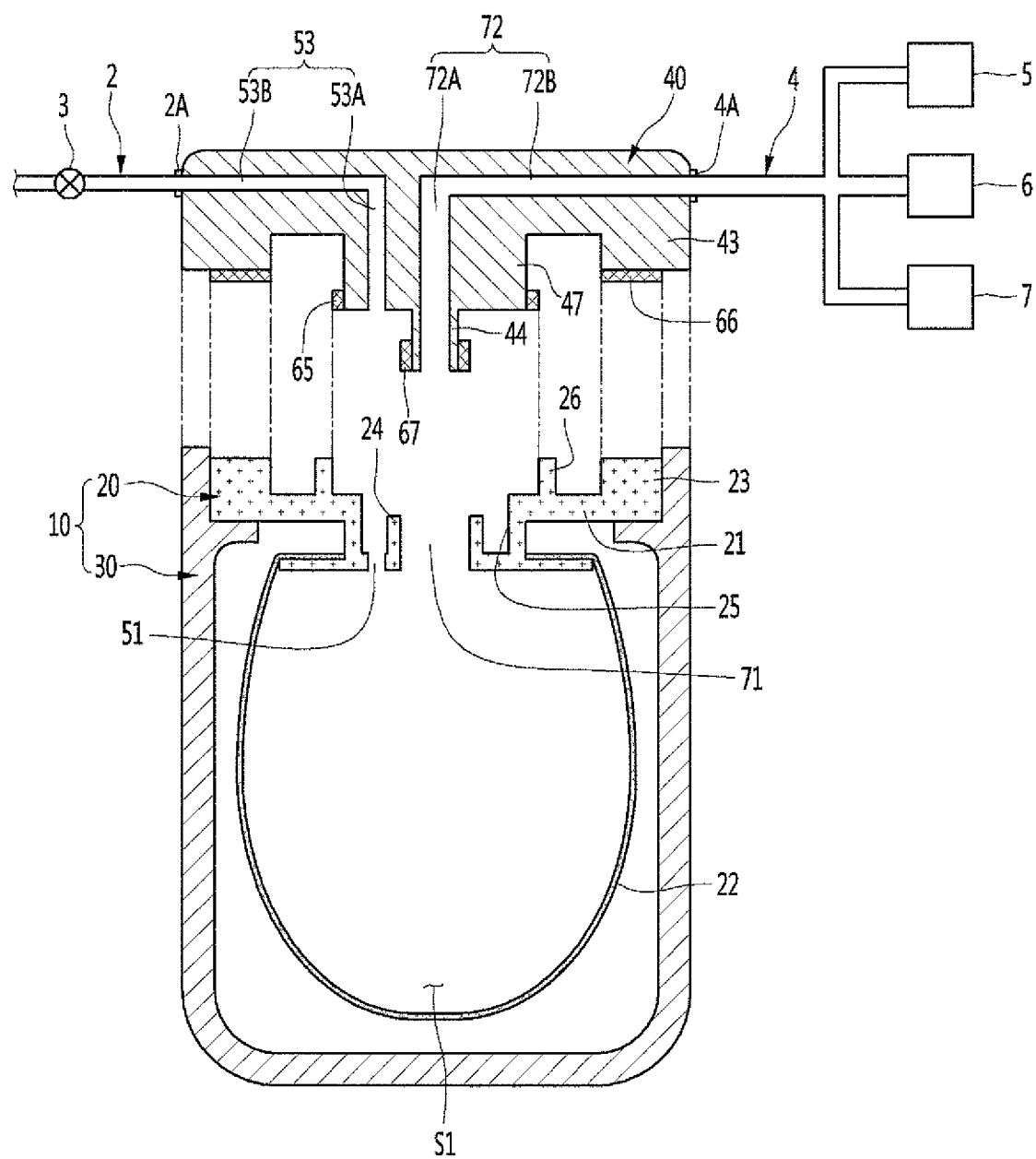
FIG. 18 is a cross-sectional view illustrating a state in which a fermentation lid of a fermenter is opened according to an embodiment.
Figure 19:
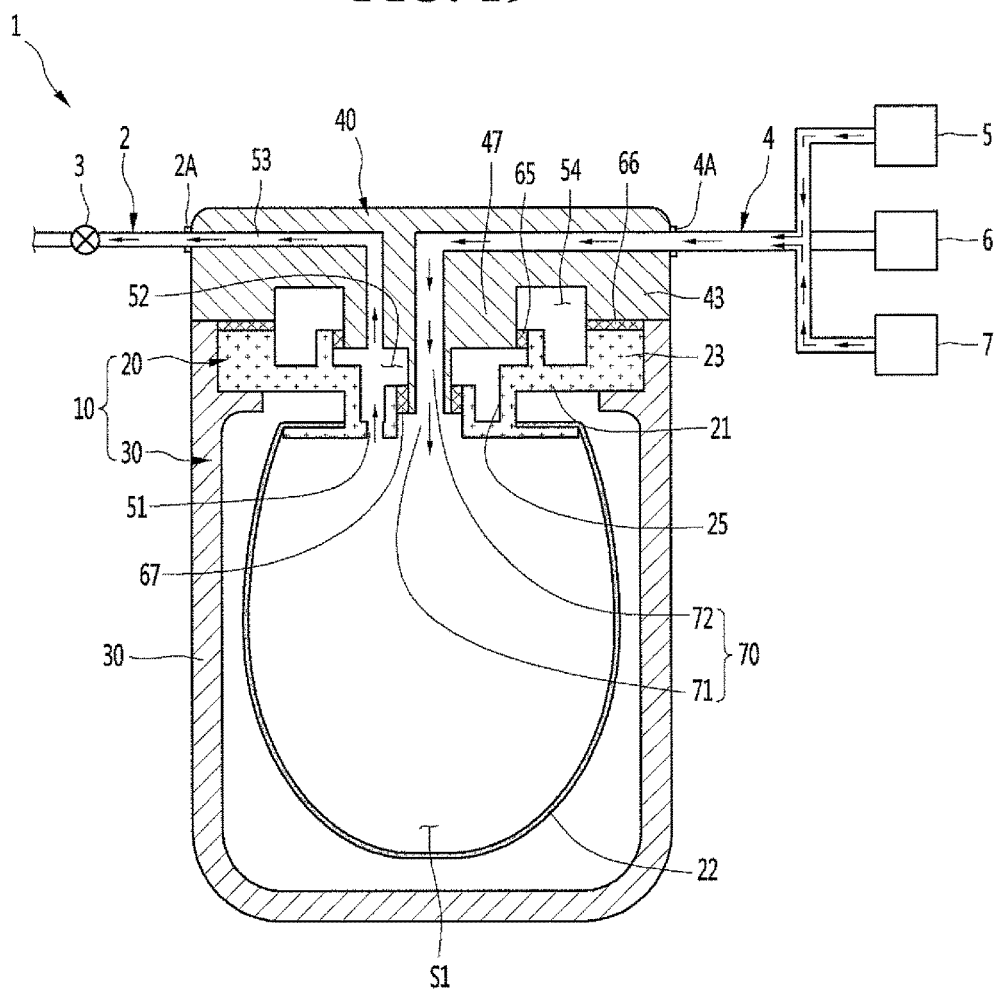
FIG. 19 is a view illustrating a flow of a fluid introduced through a main passage and a flow of a gas discharged through a gas passage when the fermentation lid of the fermenter of FIG. 18 is closed.
Figure 20:
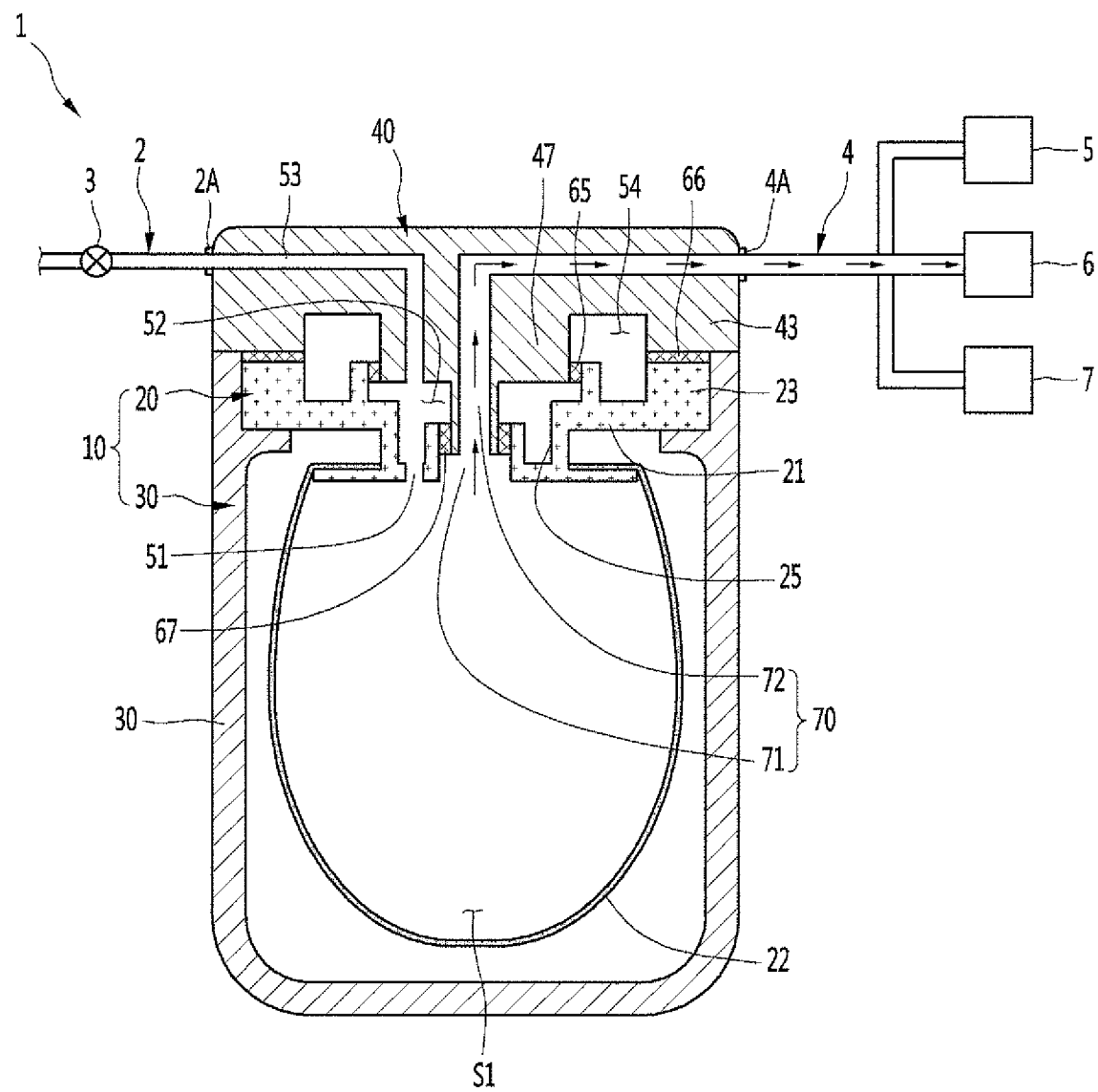
FIG. 20 is a view illustrating a flow of a beverage dispensed through the main passage when the fermentation lid of the fermenter of FIG. 18 is closed.

A fermenter 1 according to an embodiment will be described with reference to FIGS. 18 to 20. The fermenter 1 according to this embodiment is the same as that according to the previous embodiments except for a fluid passage 70 and constituents related to the fluid passage 70, and thus, their duplicated description will be omitted, and differences will be mainly described. A first fluid passage 71 spaced apart from the first gas passage 51 may be further provided in a beverage making pack 20 of the fermenter 1 according to this embodiment, and a second fluid passage 72 spaced apart from the second gas passage 53 may be further provided in a lid 40.

When the lid 40 closes the container 10, the first fluid passage 71 and the second fluid passage 72 may communicate with each other and constitute a fluid passage 70 together with each other. Since the constituents and operation of the fluid passage 70 were previously described in detail in reference to an embodiment shown in FIGS. 4-6, its duplicated description will be omitted.

Inner protrusions 24 and 44 may be respectively provided in the beverage pack 20 and the lid 40. A container-side inner protrusion 24 may be provided in the beverage pack 20. The container-side inner protrusion 24 may protrude upward from a bottom surface of the beverage pack 20 that couples the container-side inside protrusion 24 to a recess part, recess, or step portion 25. That is, at least a portion of the container-side inner protrusion 24 may be provided inside an inner or central space of the step portion 25. A first lid-side inner protrusion 44 may be provided in the lid 40. The first lid-side inner protrusion 44 may protrude downward from a bottom surface of a second lid-side inner protrusion 47. The container-side inner protrusion 24 and the first lid-side inner protrusion 44 may be provided at positions corresponding to each other. That is, the container-side inner protrusion 24 may be provided at a position that corresponds to an outside surface of the first lid-side inner protrusion 44.

The first fluid passage 71 may include an inner space of the container-side inner protrusion 24, and the second fluid passage 72 may include an inner space of the first lid-side inner protrusion 44. When the lid 40 closes the container 10, at least a portion of the first lid-side inner protrusion 44 may be inserted into the container-side inner protrusion 24. However, this embodiment is not limited thereto. When the lid 40 closes the container 10, a bottom surface or a lower outer surface of the first lid-side inner protrusion 44 may contact a top surface or an upper outer surface of the container-side inner protrusion 24.

The fermenter 1 according to this embodiment may further include a third sealing or third seal 67 sealing a gap between the first fluid passage 71 and the second fluid passage 72, in addition to a first seal 65 and a second seal 66. The third seal 67 may prevent a fluid flowing to the fluid passage 70 from leaking between the first fluid passage 71 and the second fluid passage 72. The third seal 67 may be made of a material having elasticity such as rubber.

The third seal 67 may be provided on at least one of the container-side inner protrusion 24 or the first lid-side inner protrusion 44. The third seal 67 may be compressed between an outer circumferential surface of the first lid-side inner protrusion 44 and an inner circumferential surface of the container-side inner protrusion 24 to secure gas in the beverage pack 20 and/or the container 10. However, this embodiment is not limited to the position of the third seal 67. For example, the position of the third seal 67 may vary according to a coupling relationship between the lid 40 and the container 10.

According to an embodiment, since a gas chamber communicates with each of a first gas passage and a second gas passage, gas generated during fermentation may be easily discharged even though the first gas passage and the second gas passage do not correspond to each other. Although the number of first gas passages and the number of second gas passages may be different from each other, gas may be easily discharged by the gas chamber. A sealing or seal may be provided to prevent gas within the gas chamber from leaking between the fermentation lid or lid and the fermentation container or container.

Fluid may be introduced into or discharged from the fermenter through a main passage or fluid passage. When the fermentation lid closes the fermentation container, the communication between the first main passage or first fluid passage and the second main passage or second fluid passage may encourage a user to use the fermenter safely and properly. Since at least a portion of the main passage is provided in the gas chamber, the fermenter may be more compact when compared to a structure in which the main passage is provided outside the gas chamber. The sealing or seal may be provided to prevent fluid flowing to the main passage from leaking between the first main passage and the second main passage. The fermentation lid may include an outer lid and an inner lid, and a locking part or lock may be provided on the inner lid. Thus, the user may rotate the fermentation lid to be locked. A grasp part, grip, or inner protrusion may be provided on a beverage making pack or beverage pack to allow the user to grasp the grasp part, thereby inserting and separating the beverage making pack into and from the fermentation tank.

When the fermentation lid closes the fermentation container, a buffer space may be provided between the beverage making pack and the fermentation lid. Thus, even if gas within the gas chamber leaks, the gas may not directly leak to the outside, but instead be held in the buffer space. The first sealing may prevent gas within the gas chamber from leaking, and the second sealing may prevent gas within the buffer space from leaking to improve the sealing effect and security of the fermenter.

Embodiments disclosed herein provide a fermenter in which a gas generated during a fermentation process may easily be discharged. In an embodiment, a fermenter may includes a fermentation container or container having a fermentation space or space in which a beverage may be fermented and a first gas passage communicating with the fermentation space, and a fermentation lid or lid which may open and/or close the fermentation container and having a second gas passage. When the fermentation lid closes the fermentation container, a gas chamber communicating with each of the first gas passage and the second gas passage may be provided between the fermentation container and the fermentation lid. The gas chamber may have a sectional area or cross-sectional area less than that of each of the first gas passage and the second gas passage.

The fermenter may further include a sealing or seal preventing a gas within the gas chamber from leaking between the fermentation lid and the fermentation container. The sealing may be provided on at least one of the fermentation lid and the fermentation container. A plurality of first gas passages may be provided in the fermentation container.

A first main passage or a first fluid passage communicating with the fermentation space may be further provided in the fermentation container, and when the fermentation lid closes the fermentation container, a second main passage or second fluid passage communicating with the first main passage may be further provided in the fermentation lid. Each of the first main passage and the second main passage may have a sectional area or cross-sectional area greater than that of each of the first gas passage and the second gas passage and less than that of the gas chamber. The first main passage and the second main passage may pass through the gas chamber together with each other. The first main passage may be spaced apart from the first gas passage, and the second main passage may be spaced apart from the second gas passage. The first main passage and the second main passage may constitute a main passage or a fluid passage.

The fermenter may further include a sealing or seal preventing a fluid that flows to the main passage from leaking between the first main passage and the second main passage. The sealing may be provided on at least one of the fermentation lid and the fermentation container. The first gas passage may be provided between the first main passage and an outer circumference of the fermentation container. Each of the second gas passage and the second main passage may include a vertical part or portion that is lengthily or longitudinally provided in a vertical or transverse direction, and the vertical part of the second gas passage may be provided between the vertical part of the second main passage and an outer circumference of the fermentation lid.

In an embodiment, a fermenter may include a fermentation container or container having a fermentation space or space in which a beverage is fermented and a first gas passage communicating with the fermentation space, an outer lid seated on the fermentation container, and an inner lid rotatably provided with respect to the outer lid and provided with a second gas passage. When a fermentation lid or lid closes the fermentation container, a gas chamber communicating with each of the first gas passage and the second gas passage may be provided between the fermentation container and the inner lid. A locking part or lock coupled to the fermentation container when the inner lid rotates in one direction may be provided on the inner lid.

A sealing or seal that prevents a gas within the gas chamber from leaking between the inner lid and the fermentation container may be provided on at least one of the inner lid and the fermentation container. A handle that rotates the inner lid may be provided on an upper end of the inner lid.

In an embodiment, a fermenter may include a fermentation tank or tank having an opening, a beverage making pack or beverage pack having a fermentation space or space and a first gas passage communicating with the fermentation space and inserted into the fermentation tank through the opening; and a fermentation lid or lid opening and closing the opening and having a second gas passage. When the fermentation lid closes the opening, a first space communicating with each of the first gas passage and the second gas passage may be defined between the beverage making pack and the fermentation lid.

A grasp part or inner protrusion protruding upward may be provided on the beverage making pack, and an inner space of the inner protrusion may be provided in the first space or communicate with the first space. When the fermentation lid closes the opening, a second space may be defined between the beverage making pack and the fermentation lid, and the second space may be defined outside the inner protrusion and spaced apart from the first space.

The fermenter may further include a first sealing or first seal preventing a gas within the first space from leaking to the second space, and a second sealing or second seal preventing a gas within the second space from leaking to the outside. Each of the first sealing and the second sealing may be provided on at least one of the beverage making pack or the fermentation lid. A first main passage or first fluid passage spaced apart from the first gas passage may be further provided in the beverage making pack, a second main passage or second fluid passage spaced apart from the second gas passage may be further provided in the fermentation lid, and when the fermentation lid closes the opening, the first main passage and the second main passage may communicate with each other. The fermenter may further include a third sealing or third seal that seals a gap between the first main passage and the second main passage. The third sealing may be provided on at least one of the beverage making pack and the fermentation lid.

The above-disclosed subject matter is to be considered illustrative, and not restrictive, and the appended claims are intended to cover all such modifications, enhancements, and other embodiments, which fall within the true spirit and scope of the present disclosure. Thus, the embodiment of the present disclosure is to be considered illustrative, and not restrictive, and the technical spirit of the present disclosure is not limited to the foregoing embodiment. Therefore, the scope of the present disclosure is defined not by the detailed description of the invention but by the appended claims, and all differences within the scope will be construed as being included in the present disclosure.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A fermenter comprising:
   a container having a first space in which a beverage is fermented and a first passage communicating with the first space;
   a lid opening and closing the container and having a second passage, wherein a second space communicating with the first and second passages is provided between the container and the lid when the lid closes the container;
   a third passage provided in the container and communicating with the first space in the container; and
   a fourth passage provided in the lid and communicating with the third passage when the lid closes the container.

2. The fermenter of claim 1, wherein the second space has a cross-sectional area greater than each of the cross-sectional areas of the first passage and the second passage.

3. The fermenter of claim 1, further including a seal that prevents a gas within the second space from leaking between the lid and the container, wherein the seal is provided on at least one of the lid or the container.

4. The fermenter of claim 1, wherein the first passage includes a plurality of passages provided in the container.

5. The fermenter of claim 1, wherein each of the third passage and the fourth passage has a cross-sectional area greater than each of the cross-sectional areas of the first passage and the second passage, and less than a cross-sectional area of the second space.

6. The fermenter of claim 1, wherein the third passage is spaced apart from the first passage, and the fourth passage is spaced apart from the second passage.

7. The fermenter of claim 5, further including a seal preventing a fluid from leaking between the third passage and the fourth passage, wherein the seal is provided on at least one of the lid or the container.

8. The fermenter of claim 7, wherein the first passage is provided between the third passage and an outer circumference of the container.

9. The fermenter of claim 7, wherein each of the second passage and the fourth passage include a portion that is longitudinally disposed in a vertical direction, and the portion of the second passage is provided between the portion of the fourth passage and an outer circumference of the lid.

10. The fermenter of claim 1, wherein the first and second passages are configured to allow a flow of gas, and the third and fourth passages are configured to allow a flow of a fluid that includes liquid.

11. A fermenter comprising:
a container having a space in which a beverage is fermented, and a first container passage communicating with the space;
an outer lid seated on the container; and
an inner lid which rotates with respect to the outer lid and having a first lid passage, wherein a chamber communicating with the first container passage and the first lid passage is provided between the container and the lid when the lid closes the container; and
a lock provided on the inner lid that couples to the container when the inner lid rotates.

12. The fermenter of claim 11, further including a seal provided on at least one of the inner lid or the container, wherein the seal prevents gas within the chamber from leaking between the inner lid and the container.

13. The fermenter of claim 11, further including a second lid passage provided in the outer lid that connects to the first lid passage of the inner lid and an external valve through which gas flowing in the second lid passage discharges from the fermenter.

14. A fermenter comprising:
a tank having an opening;
a pack including beverage making materials, a first space, and a first gas passage that communicates with the first space, wherein the pack is inserted into the tank through the opening;
a lid opening and closing the opening and having a second gas passage, wherein a second space communicating with each of the first gas passage and the second gas passage is defined between the pack and the lid when the lid closes the opening; and
a protrusion extending upward on the pack within the second space or communicating with the second space, wherein an inner surface of the protrusion defines a third space such that the third space is also provided within the second space.

15. The fermenter of claim 14, further including a fourth space defined outside an outer surface of the protrusion within the second space and spaced apart from the third space, and further defined between the pack and the lid when the lid closes the opening.

16. The fermenter of claim 15, further comprising:
a first seal preventing a gas within the third space from leaking to the fourth space; and
a second seal preventing a gas within the fourth space from leaking to the outside of the fermenter, wherein each of the first seal and the second seal is provided on at least one of the pack or the lid.

17. The fermenter of claim 16, further including:
a first fluid passage spaced apart from the first gas passage provided in the pack;
a second fluid passage spaced apart from the second gas passage provided in the lid; wherein the first fluid passage and the second fluid passage communicate with each other when the fermentation lid closes the opening.

18. The fermenter of claim 16, further including a third seal that seals a gap between the first fluid passage and the second fluid passage, wherein the third seal is provided on at least one of the pack or the lid.

* * * * *